US012188401B2

(12) United States Patent
Spatzenegger et al.

(10) Patent No.: US 12,188,401 B2
(45) Date of Patent: Jan. 7, 2025

(54) INTERNAL COMBUSTION ENGINE AND LUBRICATION SYSTEM THEREOF

(71) Applicant: BRP-ROTAX GMBH & CO. KG, Gunskirchen (AT)

(72) Inventors: Roland Spatzenegger, Bad Hall (AT); Markus Kronegger, Wels (AT); Tomas Andor, Hepberg (DE); Markus Hochmayr, Krenglbach (AT); Johannes Wurm, Wallern an der Trattnach (AT); Alex Zauner, Lambach (AT); Robert Ragogna, Salzburg (AT); Christoph Lindauer, Seewalchen am Attersee (AT); Thomas Kritzinger, Seewalchen am Attersee (AT); Michael Zunghammer, Gunskirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/451,430

(22) Filed: Aug. 17, 2023

(65) Prior Publication Data

US 2024/0060445 A1 Feb. 22, 2024

Related U.S. Application Data

(60) Provisional application No. 63/399,328, filed on Aug. 19, 2022.

(51) Int. Cl.
*F01M 13/04* (2006.01)
*B01D 45/12* (2006.01)
(Continued)

(52) U.S. Cl.
CPC ............... *F02B 33/04* (2013.01); *F01M 1/12* (2013.01); *F02B 75/007* (2013.01); *F02B 75/20* (2013.01);
(Continued)

(58) Field of Classification Search
CPC .... F01M 2001/126; F01M 13/04; F01M 1/02; F01M 11/08; F01M 2011/0033;
(Continued)

(56) References Cited

U.S. PATENT DOCUMENTS 2,298,646 A * 10/1942 Ovens ...................... F01M 1/16 184/6.4
5,618,335 A * 4/1997 Pink .......................... B04B 5/12 96/216
(Continued)

FOREIGN PATENT DOCUMENTS

CN 102066705 A * 5/2011 ............. B01D 45/08
CN 207660662 U * 7/2018
(Continued)

OTHER PUBLICATIONS

Westphal et al (DE 10119924 A1)—English translation (Year: 2002).*

*Primary Examiner* — George C Jin
*Assistant Examiner* — Teuta B Holbrook
(74) *Attorney, Agent, or Firm* — BCF LLP

(57) ABSTRACT

An internal combustion engine for a vehicle includes: an oil tank defining an oil reservoir; a pump to pump oil from the oil reservoir to lubricate parts of the engine; and a cyclonic separator disposed within the oil tank and configured to separate gas from oil received therein, the cyclonic separator defining an internal separator chamber for circulation of oil therein, the cyclonic separator comprising: a vortex forming portion configured to cause oil flowing therethrough within the internal separator chamber to define a spiral path in order to separate at least part of a gas content therefrom; an oil inlet for receiving oil into the internal separator chamber, the oil inlet being fluidly connected to the pump; an oil outlet for discharging oil from the internal separator chamber and into
(Continued)

the oil reservoir of the oil tank; and a gas outlet for discharging gas from the internal separator chamber.

17 Claims, 25 Drawing Sheets

(51) Int. Cl.
*F01M 1/12* (2006.01)
*F02B 33/04* (2006.01)
*F02B 75/00* (2006.01)
*F02B 75/20* (2006.01)
*F01L 1/047* (2006.01)
*F02B 75/18* (2006.01)

(52) U.S. Cl.
CPC .. *F01L 2001/054* (2013.01); *F01M 2001/126* (2013.01); *F02B 2075/1812* (2013.01)

(58) Field of Classification Search
CPC ............. F01M 2011/0079; F02B 33/04; F01L 2001/0535; F01L 2001/0537; F01L 2001/054
See application file for complete search history.

(56) References Cited

U.S. PATENT DOCUMENTS

| | | | | |
|---|---|---|---|---|
| 6,116,205 | A | 9/2000 | Troxler et al. | |
| 9,981,519 | B2 | 5/2018 | Despres-Nadeau et al. | |
| 2003/0183189 | A1 | 10/2003 | Tachibana et al. | |
| 2004/0040531 | A1 | 3/2004 | Yamamoto | |
| 2004/0245050 | A1* | 12/2004 | Kawamoto | F01M 1/02 184/6.5 |
| 2007/0163442 | A1* | 7/2007 | Saito | B01D 19/0057 96/209 |
| 2007/0181092 | A1 | 8/2007 | Hochmayr et al. | |
| 2009/0288378 | A1* | 11/2009 | Garcia | B01D 45/12 55/345 |
| 2010/0294231 | A1 | 11/2010 | Kusel | |
| 2012/0080015 | A1* | 4/2012 | Matsushima | F01M 13/04 123/573 |
| 2013/0213370 | A1* | 8/2013 | Shirabe | F02M 35/10 123/574 |
| 2017/0089234 | A1* | 3/2017 | Dawson | F16N 39/002 |
| 2018/0142586 | A1 | 5/2018 | Uezu | |
| 2020/0158015 | A1 | 5/2020 | Fuchs et al. | |

FOREIGN PATENT DOCUMENTS

| | | | | |
|---|---|---|---|---|
| DE | 2201877 | A1 * | 7/1973 | |
| DE | 10119924 | A1 * | 10/2002 | F01M 1/02 |
| DE | 10257265 | A1 * | 6/2004 | F01M 11/0004 |
| FR | 2673675 | A1 * | 9/1992 | |
| JP | 3982469 | B2 * | 9/2007 | |

* cited by examiner

INTERNAL COMBUSTION ENGINE AND LUBRICATION SYSTEM THEREOF

CROSS-REFERENCE

The present application claims priority to U.S. Provisional Patent Application No. 63/399,328, entitled "Internal Combustion Engine and Lubrication System Thereof," filed Aug. 19, 2022, the entirety of which is incorporated herein by reference.

TECHNICAL FIELD

The present technology relates to internal combustion engines and, in particular, to lubrication systems thereof.

BACKGROUND

Off-road vehicles have internal combustion engines that are subjected to particular operation conditions that may not be typical for other vehicles (including for example significant tilting and/or performing jumps in difficult environmental conditions). In addition, these engines are often high-powered engines designed to provide optimal performance.

Due to the use case of the engine of an off-road vehicle, optimal lubrication of the engine is necessary to ensure that the various components of the engine are properly lubricated and/or cooled. For instance, amongst other considerations, minimizing the gas content of the oil that lubricates the engine can be important, particularly in a dry-sump lubrication system as it could otherwise be damaging to a pump module of the lubrication system. However, the form factor of the engine can limit the implementation of a gas separation system to extract the gas content of the oil. In addition, if a gas separation system is implemented, routing the gas in an efficient manner through the engine without experience leaks can be difficult. Furthermore, the pump module of the lubrication system that ensures the circulation of the oil throughout the engine can have a complex configuration and/or be difficult to install.

Therefore, there is a desire for an engine that addresses at least some of these drawbacks.

SUMMARY

It is an object of the present to ameliorate at least some of the inconveniences present in the prior art.

According to an aspect of the present technology, there is provided an internal combustion engine for a vehicle. The engine comprises: a crankcase; a crankshaft disposed at least in part in the crankcase; a cylinder block connected to the crankcase, the cylinder block defining at least one cylinder; at least one piston operatively connected to the crankshaft and disposed in a corresponding one of the at least one cylinder; an oil tank defining an oil reservoir configured to contain oil therein; a pump configured to pump oil from the oil reservoir of the oil tank to lubricate parts of the engine; and a cyclonic separator disposed within the oil tank and configured to separate gas from oil received therein, the cyclonic separator defining an internal separator chamber for circulation of oil therein, the cyclonic separator comprising: a vortex forming portion configured to cause oil flowing therethrough within the internal separator chamber to define a spiral path in order to separate at least part of a gas content therefrom; an oil inlet for receiving oil into the internal separator chamber, the oil inlet being fluidly connected to the pump; an oil outlet for discharging oil from the internal separator chamber and into the oil reservoir of the oil tank; and a gas outlet for discharging gas from the internal separator chamber.

In some embodiments, the cyclonic separator has a peripheral wall defining the vortex forming portion; the oil outlet comprises at least one outlet opening defined by the peripheral wall along a bottom portion thereof; and the oil inlet feeds into the vortex forming portion along a top portion of the peripheral wall.

In some embodiments, the cyclonic separator comprises an outer wall disposed outwardly from the peripheral wall such that, in use, oil discharged from the internal separator chamber through the at least one outlet opening accumulates in a space defined between the peripheral wall and the outer wall; the outer wall defines at least one flow control opening spaced from a lower end of the outer wall; and in use, oil accumulating between the peripheral wall and the outer wall flows into the oil reservoir of the oil tank via the at least one flow control opening.

In some embodiments, the oil tank has an upper end and a lower end; and the cyclonic separator is disposed between the upper and lower ends of the oil tank.

In some embodiments, the oil inlet is vertically higher than the oil outlet.

In some embodiments, the oil tank comprises an oil tank housing fastened to at least one of the crankcase and the cylinder block; and the cyclonic separator is disposed between the oil tank housing and the at least one of the crankcase and the cylinder block.

In some embodiments, the cyclonic separator has an upper end and a lower end, a height of the cyclonic separator being measured between the upper and lower ends thereof; and a combined height of the crankcase and the cylinder block is greater than the height of the cyclonic separator.

In some embodiments, the crankshaft is rotatable about a crankshaft axis; and the crankshaft axis is disposed vertically between the upper and lower ends of the cyclonic separator.

In some embodiments, the cyclonic separator defines a gas exchange opening fluidly connecting the oil reservoir of the oil tank to the gas outlet of the cyclonic separator; and the cyclonic separator further comprises a backflow valve configured to close off the gas exchange opening based on an orientation of the engine.

In some embodiments, each of the at least one cylinder has an intake port and an exhaust port; the engine further comprises: at least one intake valve operable to control air flow through the intake port of a corresponding one of the at least one cylinder; at least one exhaust valve operable to control flow of exhaust gas through the exhaust port of a corresponding one of the at least one cylinder; an intake camshaft rotatable about an intake camshaft axis, the at least one intake valve being operably connected to the intake camshaft; and an exhaust camshaft rotatable about an exhaust camshaft axis, the at least one exhaust valve being operably connected to the exhaust camshaft; and at least one of the intake camshaft and the exhaust camshaft defines an outlet conduit fluidly connected to the gas outlet of the cyclonic separator.

In some embodiments, the outlet conduit is fluidly connected to the intake port of the at least one cylinder.

In some embodiments, the engine further comprises a secondary gas separator fluidly connected to the outlet conduit and disposed downstream therefrom, the secondary gas separator being rotatable to remove oil droplets from gas incoming from the outlet conduit; the secondary gas separator has a separator gas outlet fluidly connected to the intake port of the at least one cylinder; and the secondary gas separator has a separator oil outlet fluidly connected to the crankcase.

In some embodiments, the engine comprises a dry-sump lubrication system comprising the pump, the pump being a pressure pump; and the dry-sump lubrication system further comprises at least one scavenge pump configured to draw oil from a respective part of the engine.

In some embodiments, a vehicle comprises: a frame; a seat supported by the frame; a plurality of ground-engaging members operatively connected to the frame; and the engine, at least one of the ground-engaging members being operatively connected to the engine for propulsion of the vehicle.

According to another aspect of the present technology, there is provided an internal combustion engine for a vehicle. The engine comprises: a crankcase; a crankshaft disposed at least in part in the crankcase; a cylinder block connected to the crankcase, the cylinder block defining at least one cylinder; a cylinder head connected to the cylinder block; at least one piston operatively connected to the crankshaft and disposed in a corresponding one of the at least one cylinder; an oil tank defining an oil reservoir configured to contain oil therein; a dry-sump lubrication system comprising: a pressure pump configured to pump oil from the oil tank to lubricate parts of the engine; and at least one scavenge pump configured to draw oil from a respective part of the engine; a cyclonic separator fluidly connected to the oil tank and configured to separate gas from oil received therein, the cyclonic separator having a gas outlet for discharging gas from an internal separator chamber defined by the cyclonic separator; and a gas discharge passage fluidly connected to the gas outlet of the cyclonic separator, the gas discharge passage being sealed from the negative pressure generated in the crankcase by the dry sump lubrication system.

In some embodiments, each of the at least one cylinder has an intake port and an exhaust port; the engine further comprises: at least one intake valve operable to control air flow through the intake port of a corresponding one of the at least one cylinder; at least one exhaust valve operable to control flow of exhaust gas through the exhaust port of a corresponding one of the at least one cylinder; an intake camshaft rotatable about an intake camshaft axis, the at least one intake valve being operably connected to the intake camshaft; and an exhaust camshaft rotatable about an exhaust camshaft axis, the at least one exhaust valve being operably connected to the exhaust camshaft; at least one of the intake camshaft and the exhaust camshaft defines an outlet conduit fluidly connected to the gas outlet of the cyclonic separator; and the gas discharge passage comprises the outlet conduit.

In some embodiments, the outlet conduit is fluidly connected to the intake port of the at least one cylinder.

In some embodiments, the engine further comprises a secondary gas separator fluidly connected to the outlet conduit and disposed downstream therefrom, the secondary gas separator being rotatable to remove oil droplets from gas incoming from the outlet conduit; the secondary gas separator has a separator gas outlet fluidly connected to the intake port of the at least one cylinder; and the secondary gas separator has a separator oil outlet fluidly connected to the crankcase.

In some embodiments, the cylinder block defines a gas interconnecting channel that fluidly connects the gas outlet of the cyclonic separator to the outlet conduit of the at least one of the intake camshaft and the exhaust camshaft; and the gas discharge passage comprises the gas interconnecting channel.

Should there be contradictions between the definitions of terms provided in documents incorporated herein by reference and definitions of such terms provided in the present application, the definitions in the present application prevail.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
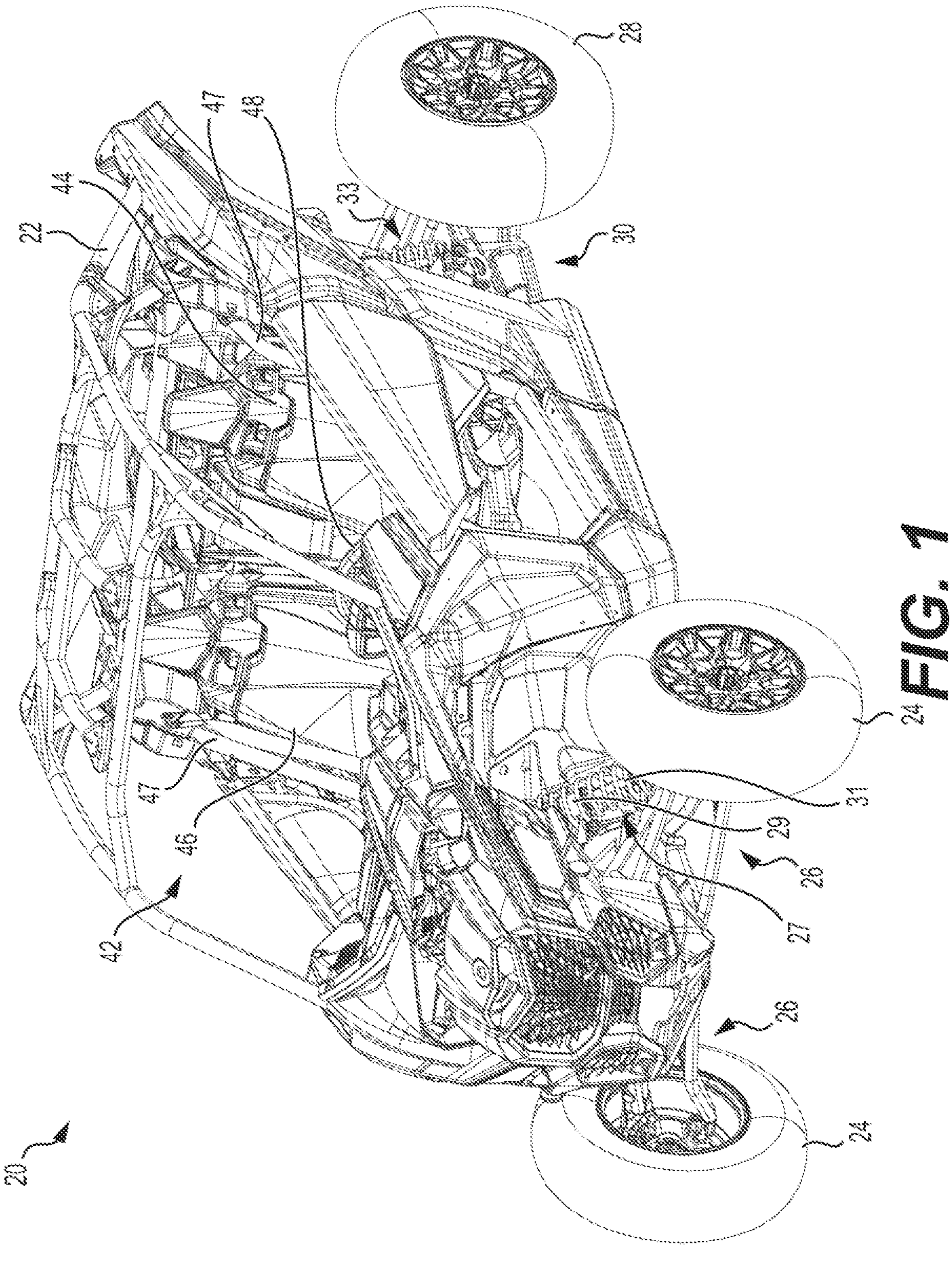
FIG. 1 is a perspective view taken from a top, front, left side of an off-road vehicle.

An internal combustion engine 100 will be described herein with respect to a four-wheel side-by-side off-road vehicle 20, but it is contemplated that the engine 100 could be used in other types of vehicles such as, but not limited to, off-road vehicles having more or less than four wheels and/or more or less than two seats. The general features of the off-road vehicle 20 will be described with respect to FIGS. 1 and 2.

The vehicle 20 has a frame 22, two front wheels 24 connected to a front of the frame 22 by front suspension assemblies 26 and two rear wheels 28 connected to the frame 22 by rear suspension assemblies 30 such as those described in U.S. Pat. No. 9,981,519, issued May 29, 2018, incorporated herein by reference. Each front suspension assembly 26 has a front shock absorber assembly 27 including a shock absorber 29 and a spring 31. Each rear suspension assembly 30 has a rear shock absorber assembly 33 including a shock absorber 35 and a spring 37. Ground-engaging members other than wheels 24, 28 are contemplated for the vehicle 20, such as tracks or skis. In addition, although four ground engaging members are illustrated in the Figures, the vehicle 20 could include more or less than four ground engaging members. Furthermore, different combinations of ground engaging members, such as tracks used in combination with skis, are contemplated.

The frame 22 defines a central cockpit area 42 inside which are disposed a driver seat 44 and a passenger seat 46. In the present implementation, the driver seat 44 is disposed on the left side of the vehicle 20 and the passenger seat 46 is disposed on the right side of the vehicle 20. However, it is contemplated that the driver seat 44 could be disposed on the right side of the vehicle 20 and that the passenger seat 46 could be disposed on the left side of the vehicle 20. As can be seen in FIG. 1, the vehicle 20 further has a seat belt 47 for each one of the seats 44, 46. A steering wheel 48 is disposed in front of the driver seat 44. The steering wheel 48 is used to turn the front wheels 24 to steer the vehicle 20. Various displays and gauges 50 are disposed in front of the steering wheel 48 to provide information to the driver regarding the operating conditions of the vehicle 20. Examples of displays and gauges 50 include, but are not limited to, a speedometer, a tachometer, a fuel gauge, a transmission position display, and an oil temperature gauge.

Figure 2:
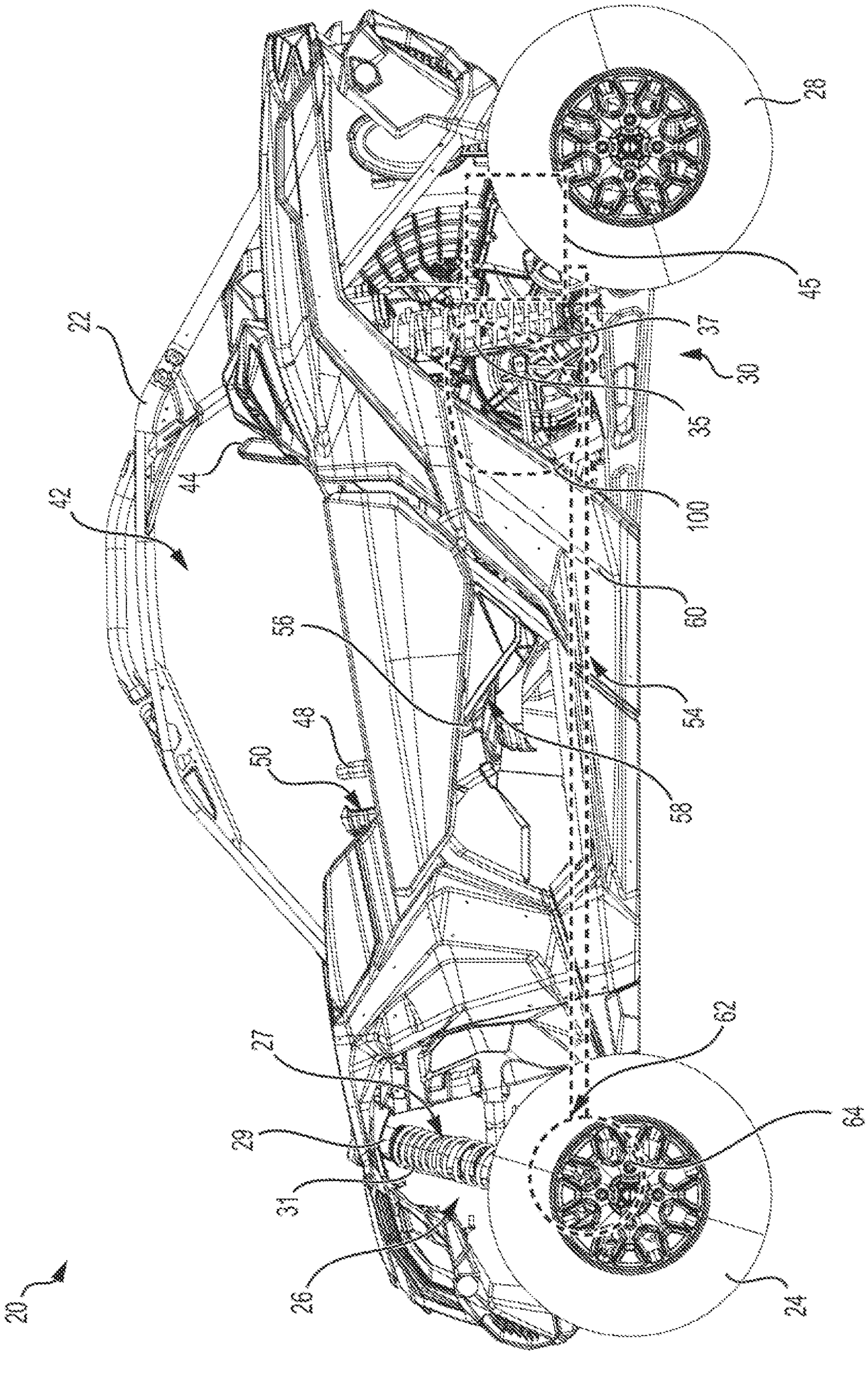
FIG. 2 is a left side elevation view of the off-road vehicle of FIG. 1.

As illustrated schematically in FIG. 2, the engine 100 is connected to the frame 22 in a rear portion of the vehicle 20. The engine 100 has a crankshaft 102 (FIG. 3) that is operatively connected to a dual-clutch transmission (DCT) 45 disposed behind the engine 100. The DCT 45 is operatively connected to a driveline 54 (illustrated schematically in FIG. 2) of the vehicle 20 for operatively connecting the front and rear wheels 24, 28 to the engine 100 in order to propel the vehicle 20. A drive selector 56 located between the seats 44, 46 operates the DCT 45 of the vehicle 20, and enables the driver to select one of a plurality of gear configurations for operation of the vehicle 20. It is contemplated that paddle shifters (not shown) could be mounted to the steering wheel 48 for enabling the driver to select a gear for operation of the vehicle 20.

A driving mode selector button 58 (FIG. 2) also enables the driver to select 2×4 or 4×4 operation of the vehicle 20. More particularly, the driveline 54 includes a front propeller shaft 60 which extends horizontally to the left of the engine 100 towards a front differential assembly 62 (schematically shown in FIG. 2). The front differential assembly 62 is operatively connected to the front wheels 24 via front wheel axle assemblies (not shown). The front differential assembly 62 includes an electronic selector 64 (also schematically shown in FIG. 2) operatively connected to the driving mode selector button 58. The electronic selector 64 allows to selectively connect the front propeller shaft 60 to the front wheel axle assemblies to enable 4×4 driving mode of the vehicle 20, or to selectively disconnect the front propeller shaft 60 from the front wheel axle assemblies to enable 2×4 driving mode of the vehicle 20 (i.e., with only the rear wheels 28 propelling the vehicle 20).

The vehicle 20 further includes other components such as brakes, a radiator, headlights, and the like. As it is believed that these components would be readily recognized by one of ordinary skill in the art, further explanation and description of these components will not be provided herein.

Figure 7:
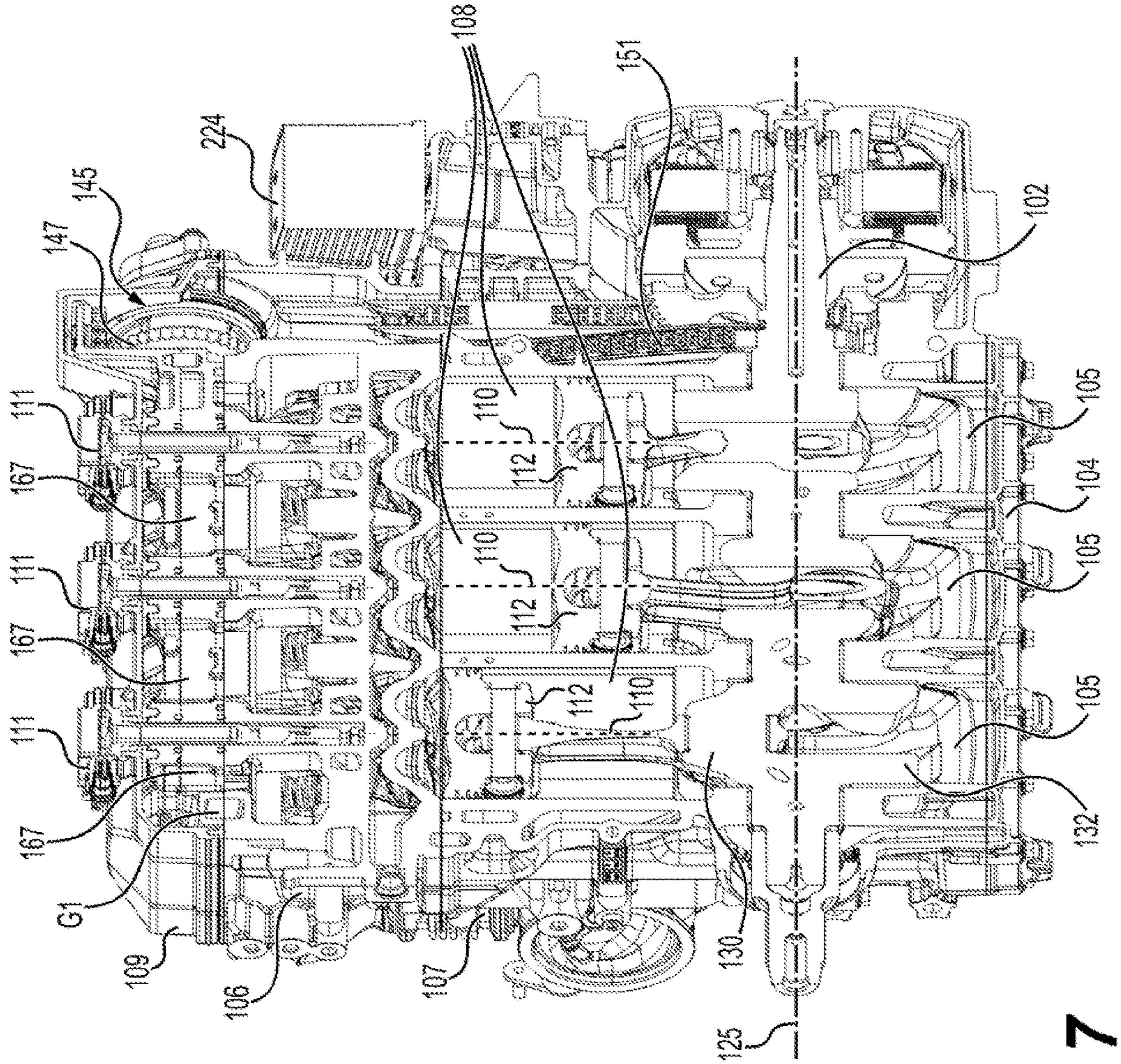
FIG. 7 is a perspective view of a cross-section of the engine of FIG. 3 taken along line 7-7 in FIG. 6.

Turning to FIGS. 3 to 6, the engine 100 will now be described in more detail. The engine 100 has a crankcase 104 in which the crankshaft 102 is partly disposed, and a cylinder block 107 connected to the crankcase 104. Part of the crankshaft 102 extends out from the crankcase 104 on a rear side of the engine 100 to be connected to the DCT 45 (FIG. 2). The crankshaft 102 is rotatable about a crankshaft axis 125 and extends along the longitudinal direction of the vehicle 20. As shown in FIG. 7, the cylinder block 107 defines three cylinders 108 that receive respective pistons 112 which are operatively connected to the crankshaft 102 and reciprocate along respective cylinder axes 110 of the cylinders 108. The engine 100 could have a different number of cylinders in other embodiments. The crankcase 104 defines three crankcase chambers 105 (FIG. 7) that are associated with respective ones of the pistons 112. Notably, each crankcase chamber 105 receives a corresponding crank pin 130 and counterweight 132 of the crankshaft 102. Each piston 112 is connected to a respective one of the crank pins 130.

Figure 8A:
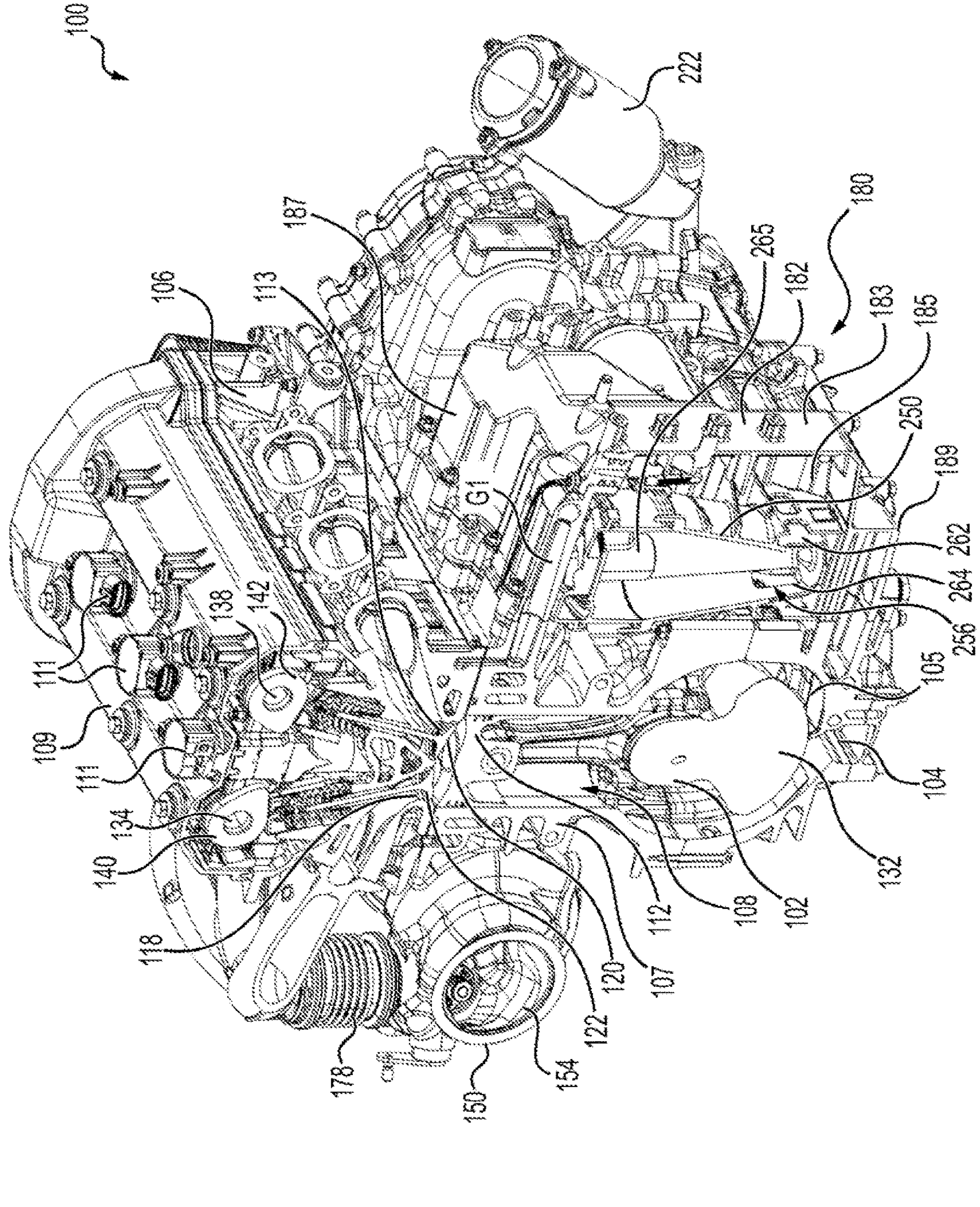
FIG. 8A is a perspective view of a cross-section of the engine of FIG. 3 taken along line 8A-8A in FIG. 6.

With reference to FIG. 7, a cylinder head 106 is disposed above the cylinder block 107 and closes off the cylinders 108. A plurality of spark plugs 111 is mounted to a valve cover 109 that is connected to the cylinder head 106. The spark plugs 111 are configured for sparking an air-fuel mixture in respective combustion chambers defined between the cylinders 108 and the pistons 112. As best shown in FIG. 8A, each cylinder 108 has an intake port 113 and an exhaust port 118 for respectively receiving air into the cylinder 108 and discharging exhaust gas from the cylinder 108. In this embodiment, the intake ports 113 and the exhaust ports 118 of the cylinders 108 are defined by the cylinder head 106. Moreover, each cylinder 108 is associated with a corresponding intake valve 120 and a corresponding exhaust valve 122. Notably, the intake valve 120 is operable to control air flow through the intake port 113 of the cylinder 108, while the exhaust valve 122 is operable to control flow of exhaust gas through the exhaust port 118 of the cylinder 108.

Figure 21:
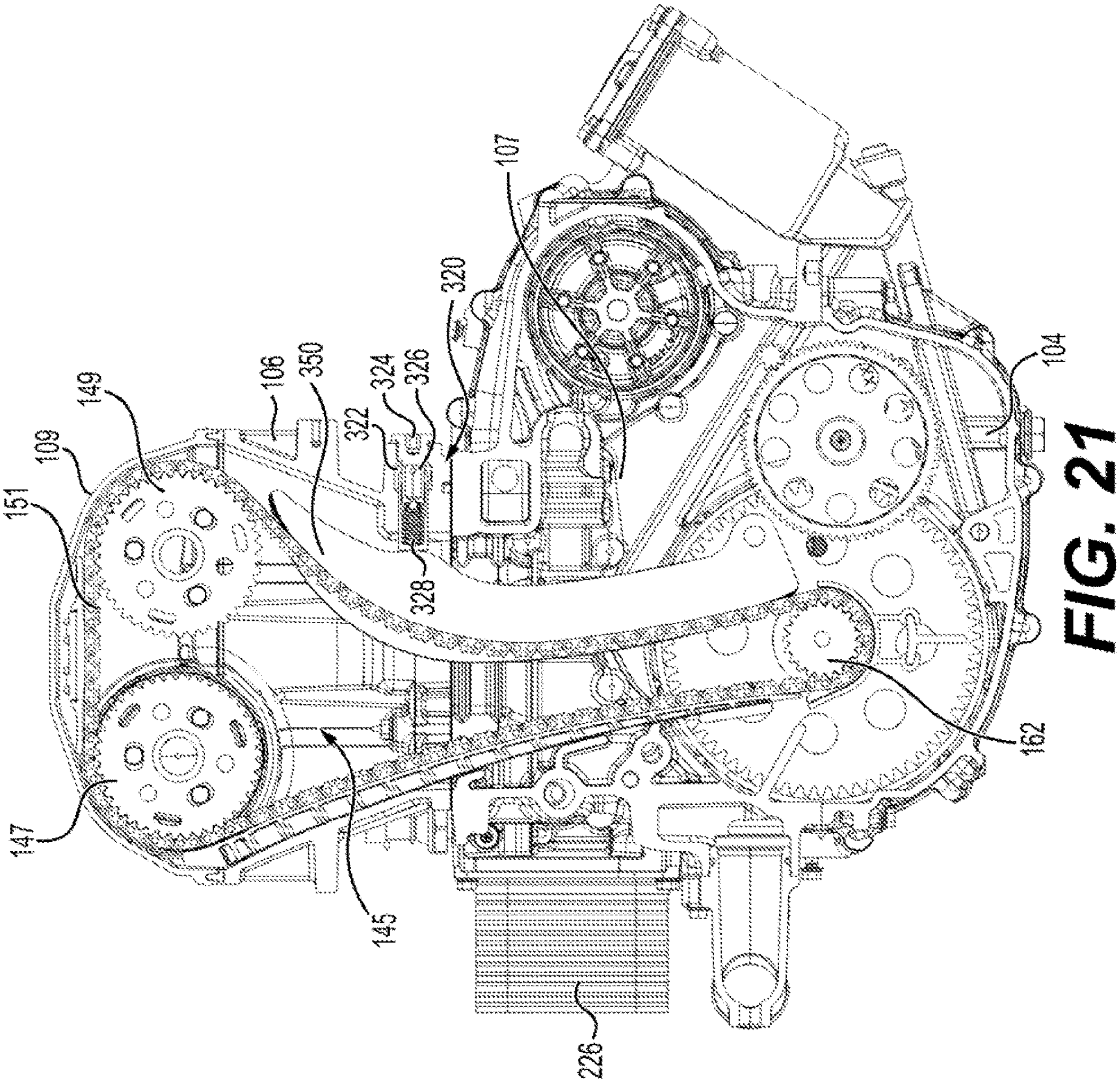
FIG. 21 is a cross-sectional view of the engine of the engine of FIG. 3 taken along line 21-21 in FIG. 6.

As shown in FIG. 8A, in this embodiment, the exhaust valves 122 are operatively connected to an exhaust camshaft 134 that is rotatable about a camshaft axis 136 (FIG. 9), while the intake valves 120 are operatively connected to an intake camshaft 138 that is rotatable about another camshaft axis (not shown). In particular, cams 140, 142 are respectively connected to the exhaust and intake camshafts 134, 138 to rotate together therewith and thereby actuate the associated intake and exhaust valves 120, 122. As shown in FIG. 21, a timing chamber 145 is defined by the crankcase 104, the cylinder block 107, the cylinder head 106 and the valve cover 109 and contains the timing mechanism for ensuring rotation of the camshafts 134, 138. Notably, the timing chamber 145 contains an exhaust gear 147 mounted to the exhaust camshaft 134, an intake gear 149 mounted to the intake camshaft 138, and a chain 151 connecting the exhaust gear 147 and the intake gear 149 to a chain gear 162 mounted to the crankshaft 102. In particular, as shown in FIG. 21, the chain 151 wraps about the exhaust and intake gears 147, 149 and the chain gear 162 to cause the chain gear 162 to drive the exhaust and intake gears 147, 149 and therefore the exhaust and intake camshafts 134, 138. Furthermore, in this embodiment, a chain guide 350 is disposed within the timing chamber 145 and guides a position of the chain 151. As will be described in greater detail below, a chain tensioner 320 (FIGS. 21, 22) is also provided to tension the chain 151 by acting on the chain guide 350.

In this embodiment, the timing chamber 145 is isolated from the crankcase chambers 105 defined by the crankcase 104 and operates under negative pressure. In particular, an internal wall 171 (FIG. 9) of the crankcase 104, which defines in part the timing chamber 145 and through which the crankshaft 102 extends, separates the timing chamber 145 from the crankcase chambers 105.

Figure 5:
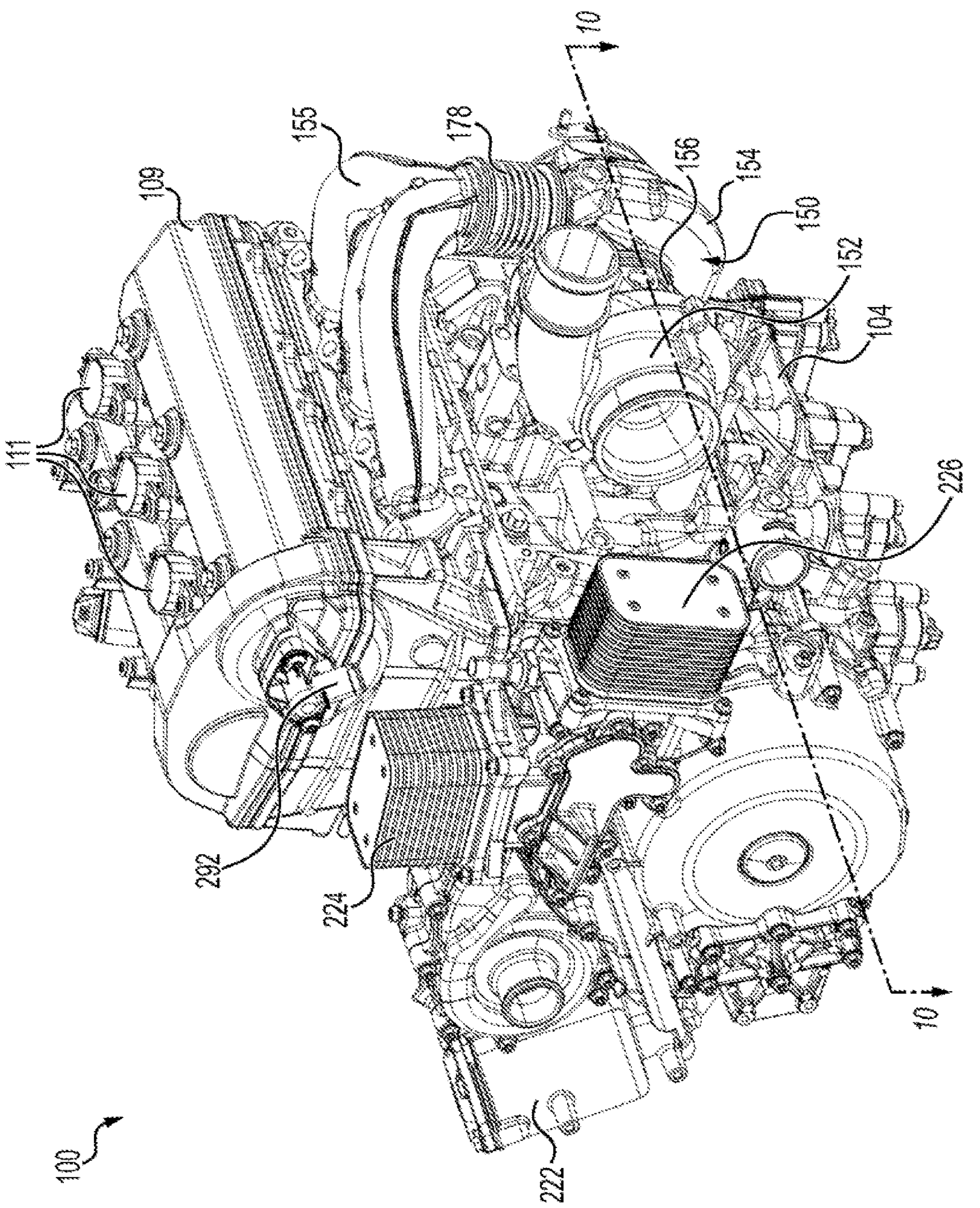
FIG. 5 is a perspective view taken from a top, front, left side of the engine of FIG. 3.
Figure 6:
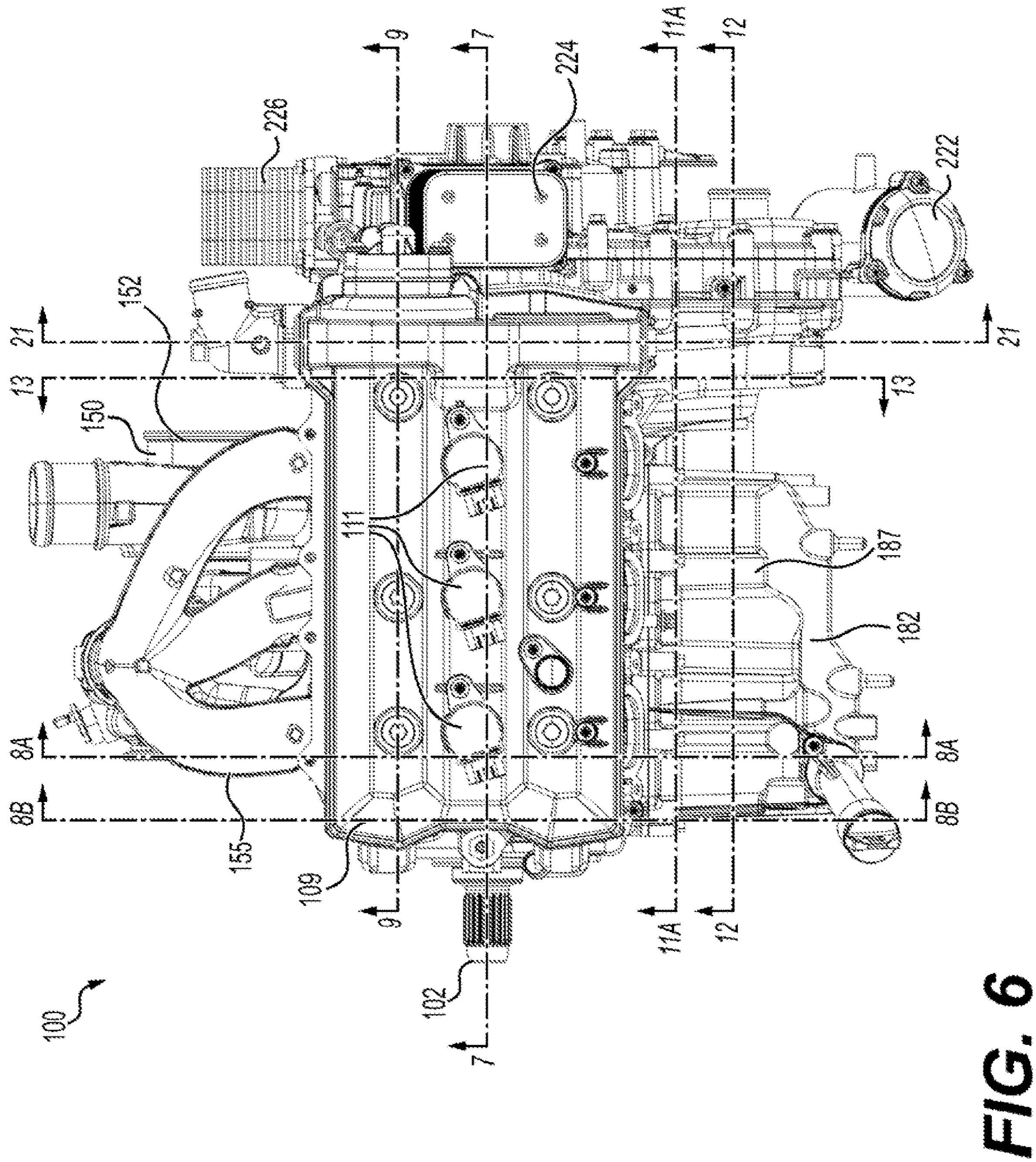
FIG. 6 is a top plan view of the engine of FIG. 3.
Figure 10:
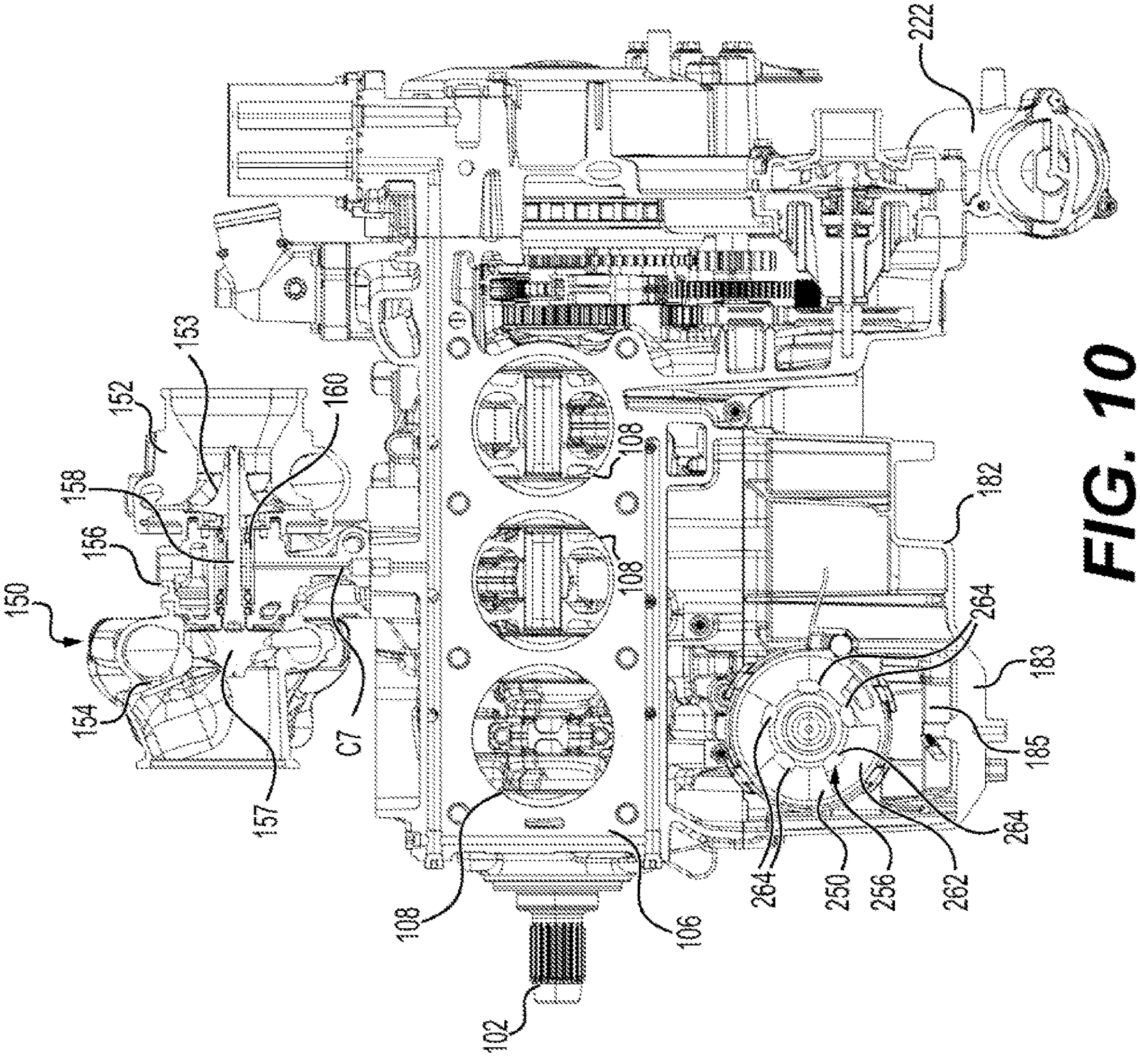
FIG. 10 is a cross-sectional view of the engine of FIG. 3 taken along line 10-10 in FIG. 5.

With reference to FIGS. 5 and 10, in this embodiment, the engine 100 has a turbocharger 150 for feeding compressed air into the cylinders 108. As shown in FIG. 10, the turbocharger 150 has a compressor 152 including a compressor wheel 153 mounted to a rotary shaft 158. The turbocharger 150 also has a turbine 154 including a turbine wheel 157 that is also mounted to the rotary shaft 158. The turbine 154 is fluidly connected to the exhaust ports 118 of the cylinders 108 by an exhaust manifold 155 (FIG. 5) in order to receive the exhaust gas discharged therefrom. The exhaust gas received by the turbine 154 causes the turbine wheel 157 to rotate the rotary shaft 158 which in turn causes the compressor 152 to compress air. The compressor 152 is fluidly connected to an air intake system of the engine 100 and thus to the intake ports 113 of the cylinders 108 in order to feed the compressed air thereto. A bearing housing 156 is disposed between the compressor 152 and the turbine 154 and rotatably supports the rotary shaft 158 via a bearing cartridge 160.

In this embodiment, as shown in FIG. 5, a flexible member 178 fluidly connects the exhaust manifold 155 to an inlet of the turbine 154. The flexible member 178 can compensate for the thermal expansion of the rigid components it connects which can facilitate an internal fluid connection of the turbocharger 150 to the cylinder block 107 in order to lubricate certain components of the turbocharger 150 in a manner that will be described in greater detail below.

The engine 100 also includes other components such as a starter motor 135. As it is believed that these components would be readily recognized by one of ordinary skill in the art, further explanation and description of these components will not be provided herein.

Figure 3:
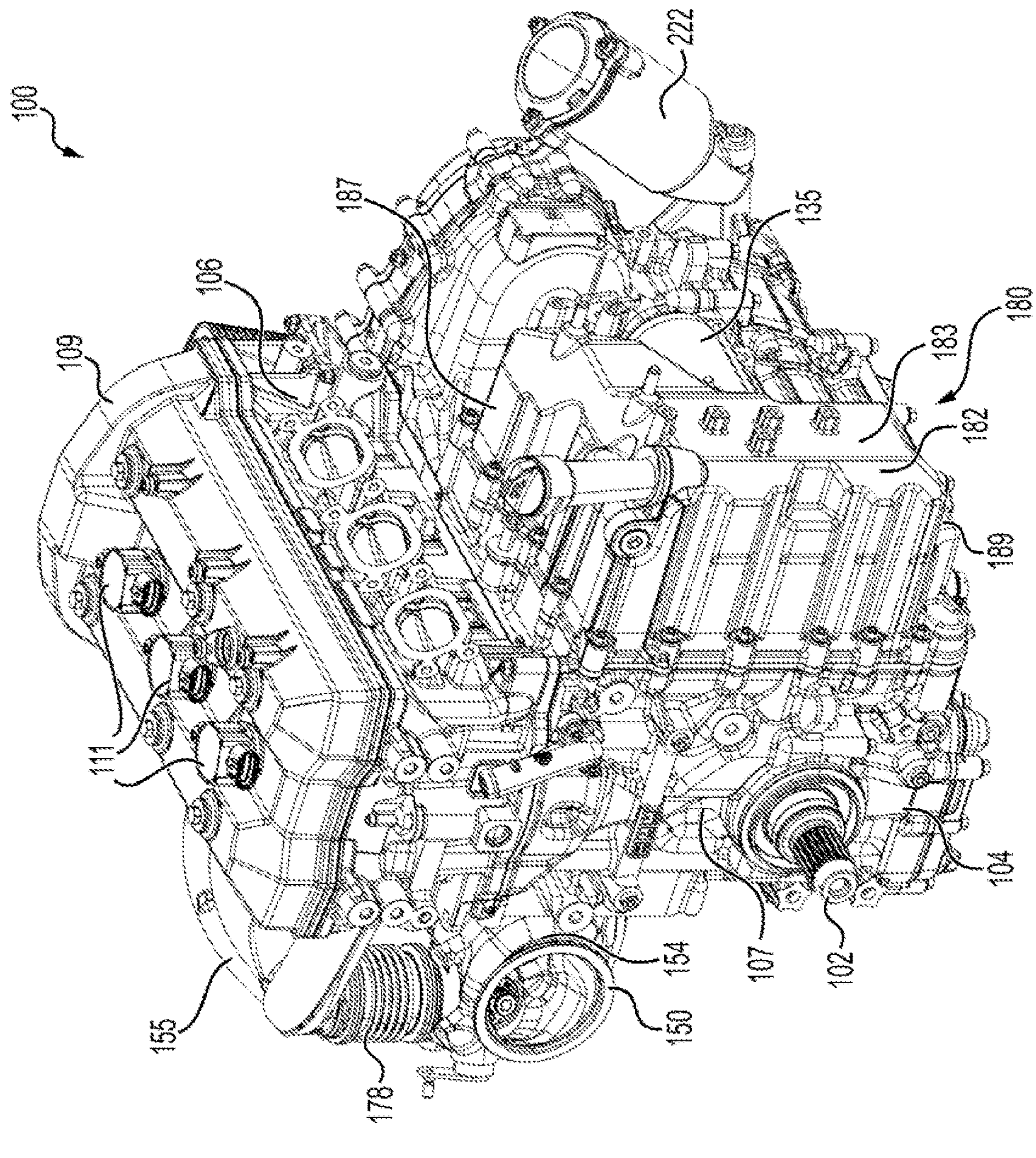
FIG. 3 is a perspective view taken from a top, rear, right side of an engine of the off-road vehicle of FIG. 1.
Figure 4:
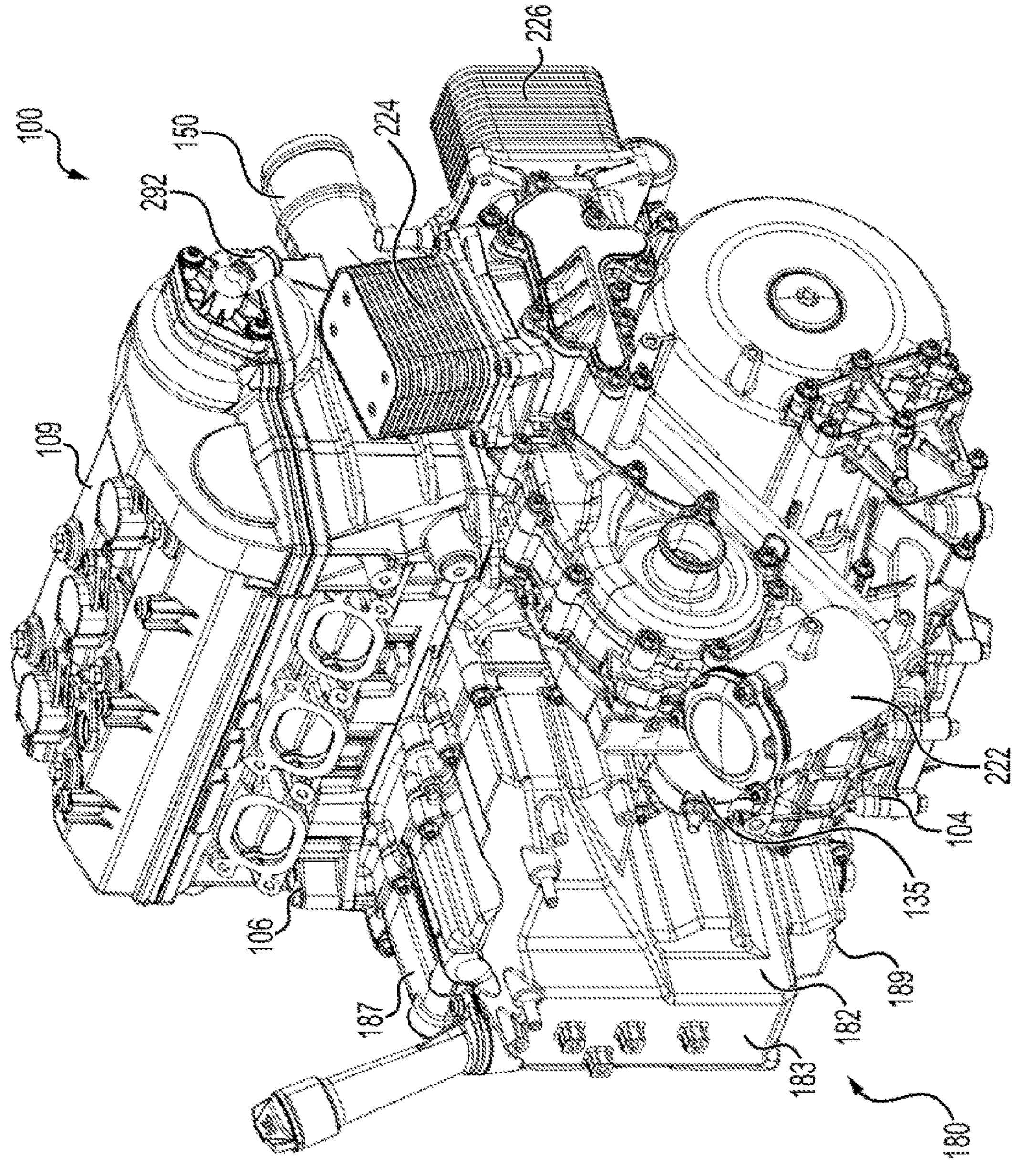
FIG. 4 is a perspective view taken from a top, front, right side of the engine of FIG. 3.

As will now be described in greater detail with particular reference to FIGS. 15 to 19, a lubrication system 180 of the engine 100 circulates oil throughout different parts of the engine 100 for lubrication thereof. The lubrication system 180 includes an oil tank 182 (FIGS. 3, 4 and 8) and a pump module 184 for pumping the oil to and from the oil tank 182. As best shown in FIGS. 3 and 4, the oil tank 182 includes an oil tank housing 183 that is fastened to the crankcase 104 to define a reservoir 185 (FIG. 8A) within which some quantity of oil is contained. As will be appreciated, FIGS. 15 to 19 which primarily illustrate a path traced by the oil circulated by the lubrication system 180 do not show the oil tank 182 or the oil contained therein in order to show components disposed within the oil tank 182 as will be discussed in more detail below.

In this embodiment, the lubrication system 180 is a dry-sump lubrication system and the pump module 184 thus includes a pressure pump 186 and a plurality of scavenge pumps 188. The pressure pump 186 pumps the oil from the oil tank 182 outwards towards the different parts of the engine 100, while the scavenge pumps 188 collect oil through various oil paths from different parts of the engine 100. In particular, the scavenge pumps 188 generate a negative pressure within the crankcase 104 of the engine 100. It is noted that "negative pressure" is to be understood with respect to other portions of the engine; the pressure may still be above atmospheric pressure. The pressure difference, e.g. between the crankcase 104 and the oil tank 182, aids in facilitating evacuation of oil and blowby gas. In this embodiment, the pump module 184 is disposed on an opposite side of the engine 100 from the turbocharger 150.

Figure 11A:
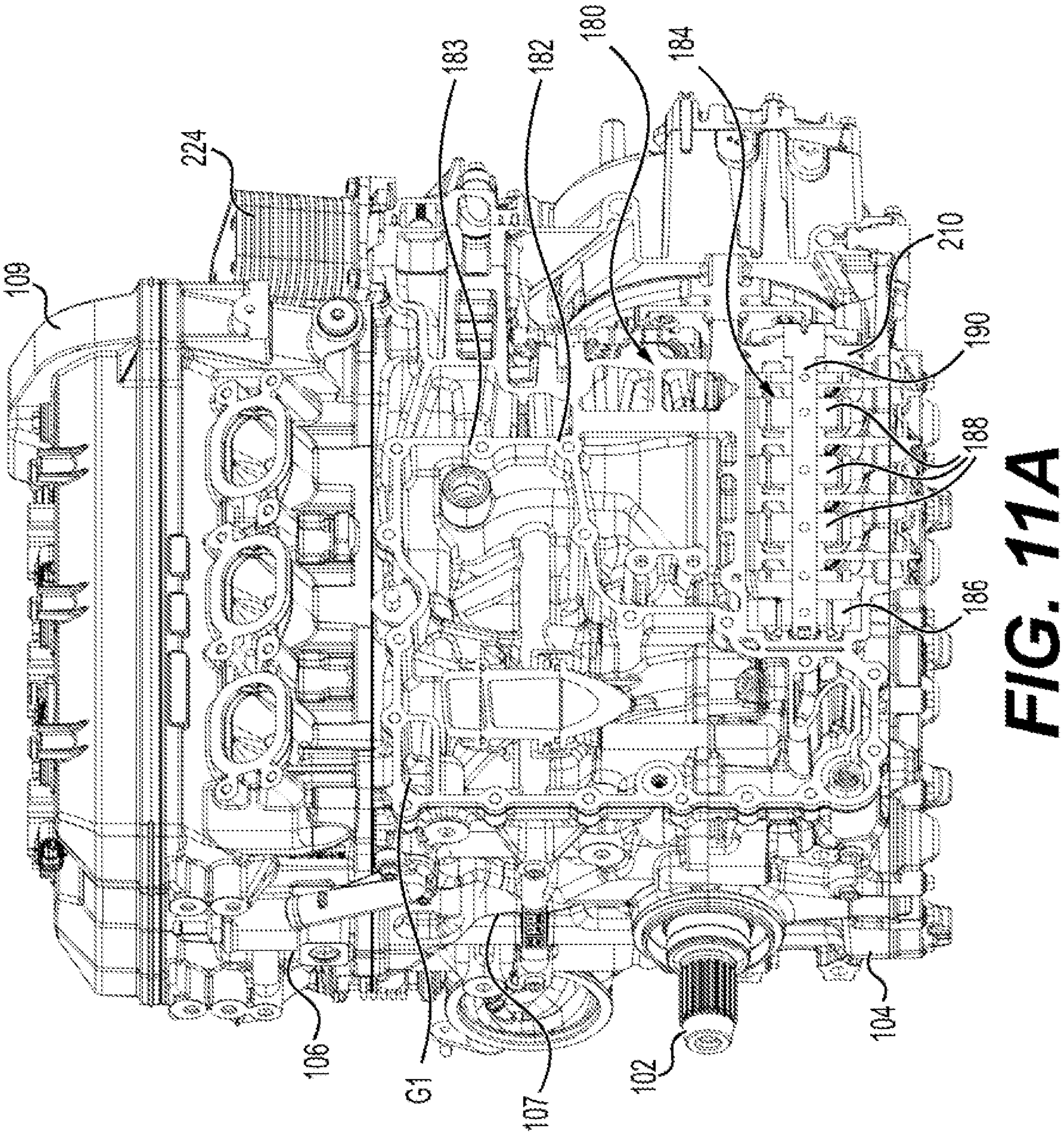
FIG. 11A is a cross-sectional view of the engine of FIG. 3 taken along line 11A-11A in FIG. 6.
Figure 11B:
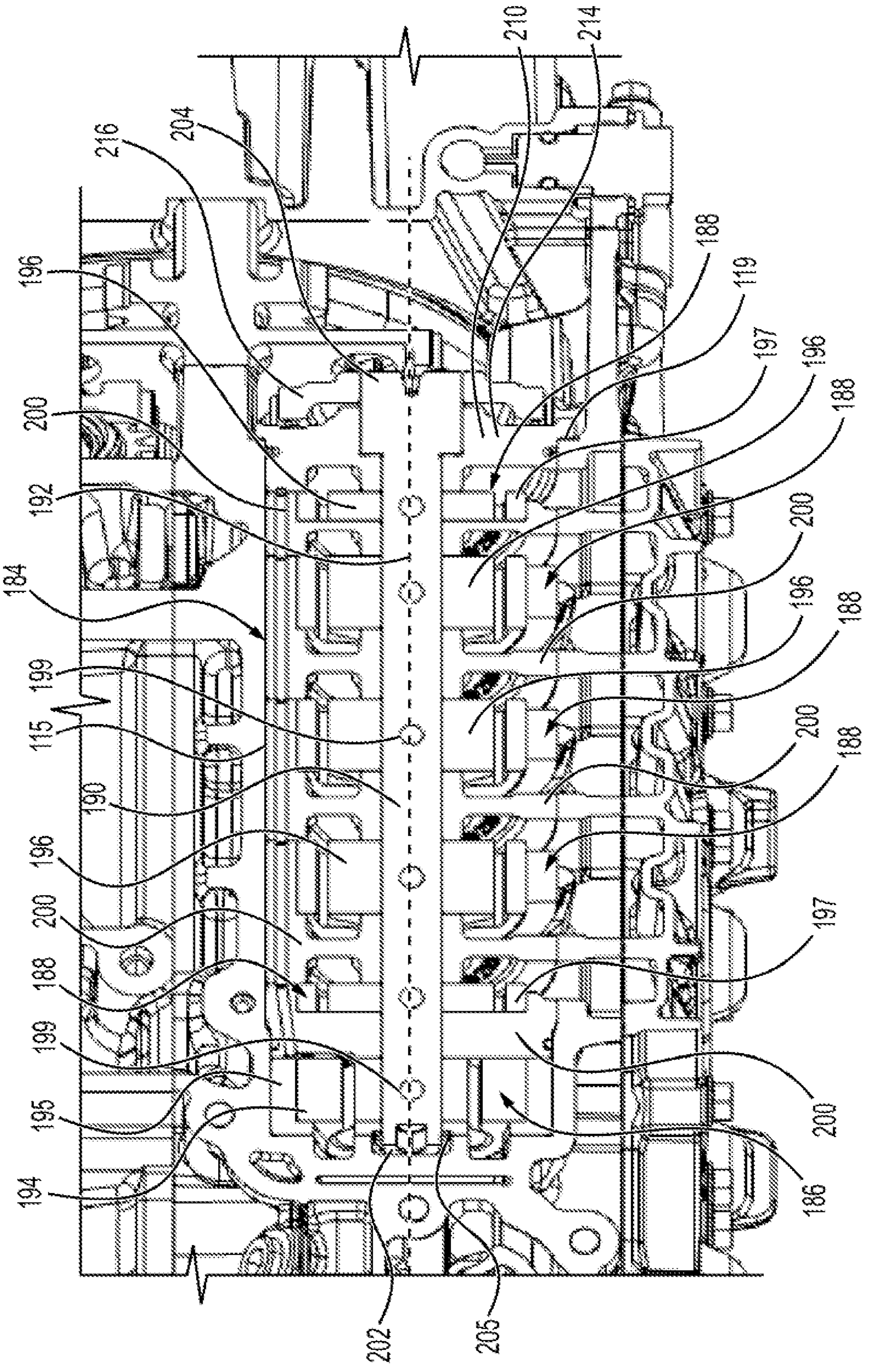
FIG. 11B is a detailed view of part of FIG. 11A.

With reference to FIGS. 11A and 11B, the pressure pump 186 and the scavenge pumps 188 are mounted to a pump shaft 190 of the pump module 184. The pump shaft 190 extends along and rotates about a pump shaft axis 192. An inner rotor 194 of the pressure pump 186 and respective inner rotors 196 of the scavenge pumps 188 are mounted to the pump shaft 190 to rotate together with the pump shaft 190 about the pump shaft axis 192. Notably, a respective pin 199 fixes each inner rotor 194, 196 to the pump shaft 190. It is contemplated that the pump shaft 190 could have a polygonal shape, with the rotors (described hereafter) having corresponding polygonal opening that engage the shaft 190. The pressure pump 186 also has an outer rotor 195 surrounding and receiving the inner rotor 194. The inner rotor 194 engages the outer rotor 195 such that the outer rotor 195 rotates with the inner rotor 194. Similarly, each scavenge pump 188 has an outer rotor 197 surrounding and receiving the corresponding inner rotor 196. The inner rotor 196 engages the outer rotor 197 such that the outer rotor 197 rotates with the inner rotor 196. In particular, the pump module 184 has a plurality of static housing members 200 that retain respective ones of the outer rotors 195, 197 in place. The static housing members 200 are mounted to the pump shaft 190 but do not rotate together therewith. The static housing members 200 define respective inlets (not shown) and outlets (not shown) of respective ones of the pressure and scavenge pumps 186, 188. Four of the static housing members 200 are partially disposed axially (i.e., along the pump shaft axis 192) between the inner rotors 194 of each two consecutive ones of the scavenge pumps 188. One of the static housing members 200 is partially disposed axially between the inner rotor 194 of the pressure pump 186 and the inner rotor 194 of a closest one of the scavenge pump 188.

Figure 13:
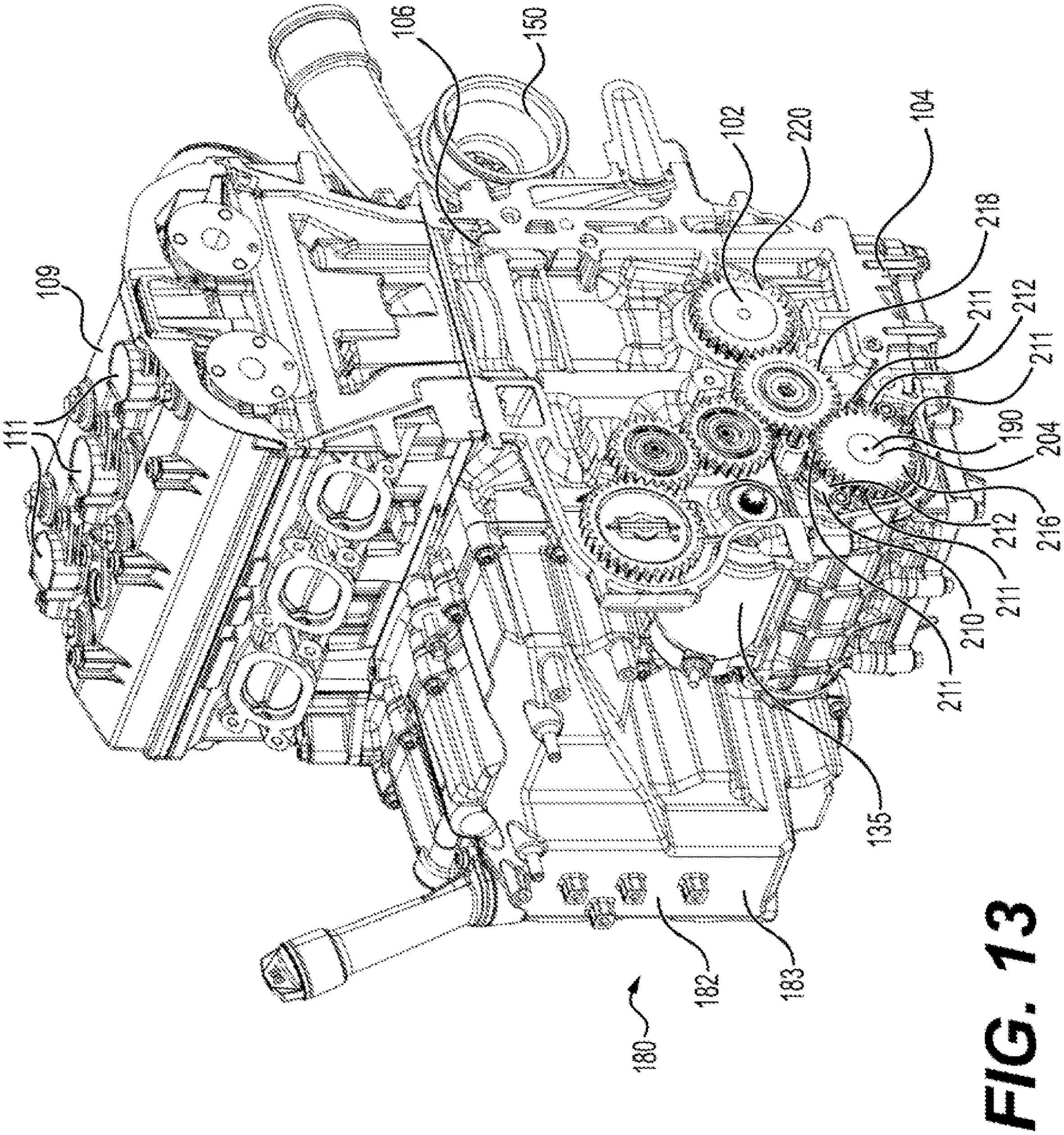
FIG. 13 is a perspective view of a cross-section of the engine of FIG. 3 taken along line 13-13 in FIG. 6.
Figure 14:
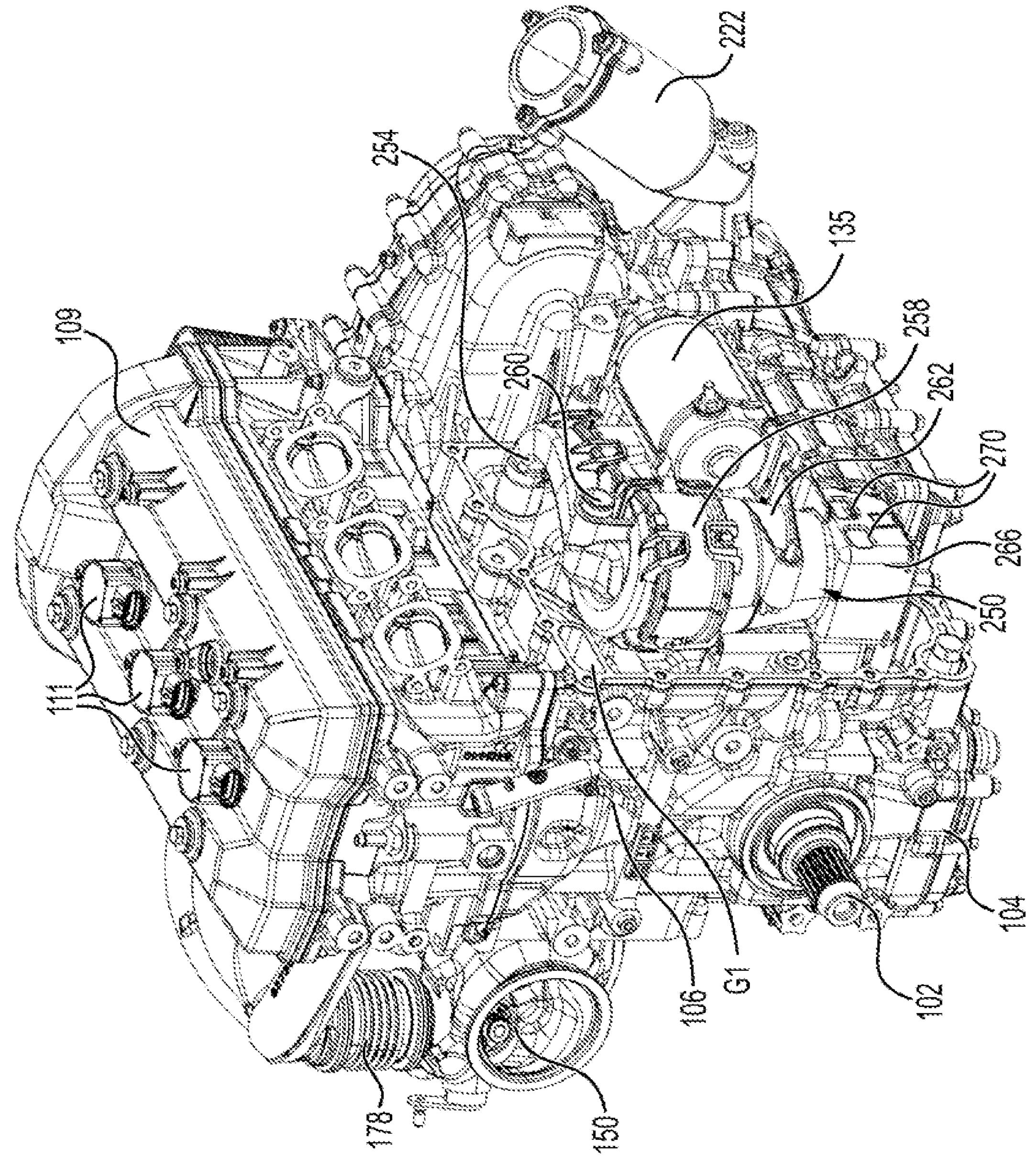
FIG. 14 is a perspective view taken from a top, rear, right side of the engine of FIG. 3 with an oil tank housing thereof removed to expose a cyclonic separator of the engine.

As can be seen in FIG. 11B, the pump shaft 190 has an inner end 202 and an outer end 204 opposite the inner end 202. In this embodiment, the pressure pump 186 is disposed closer to the inner end 202 of the pump shaft 190 than any of the scavenge pumps 188. The inner end 202 is rotatably supported by an inner wall 205 of the crankcase 104, and the outer end 204 is rotatably supported by an outer flange 210 of the pump module 184 disposed near or at the outer end 204 of the pump shaft 190. Notably, in this embodiment, the pump module 184 is received within a cavity 115 defined by the crankcase 104, namely by the inner wall 205 thereof. As can be seen in FIG. 11A, in this embodiment, the cavity 115 (and thus the pump module 184) are disposed near or at a lower end of the engine 100 and on a right side thereof (i.e., to the right of a plane containing the cylinder axes 110). The outer flange 210 is rotatably connected to the pump shaft 190 and fastened to the crankcase 104 by four fasteners 211 (FIG. 13) to secure the pump module 124 in place. More specifically, as shown in FIG. 13, the outer flange 210 has two extending portions 212 that extend outwards from a central portion 214 (FIG. 11B) of the outer flange 210 and which are fastened to an outer surface 119 of the crankcase 104 by the fasteners 211. In particular, two of the fasteners 211 secure each of the extending portions 212 to the outer surface 119. Furthermore, in this embodiment, the outer flange 210 is spaced from the outer surface 119 of the crankcase 104 such that a gap (not shown) is defined between the extending portions 212 of the outer flange 210 and the outer surface 119. The gap defined between the extending portions 212 and the outer surface 119 places the pressure pump 186, the scavenge pumps 188 and the static housing members 200 in tension such as to compress these components together. Notably, in this embodiment, the pump module 184 is pre-assembled and then inserted into the cavity 115 through an open end thereof. As such, the pressure pump 186, which is disposed closer to the inner end 202 of the pump shaft 190 is disposed closer to a closed end of the cavity 115 (opposite the open end). The closed end of the cavity 115 is defined by the inner wall 205 of the crankcase 104.

As best shown in FIG. 13, in this embodiment, the pump shaft 190 is operatively connected to the crankshaft 102 in order to rotate in response to rotation of the crankshaft 102. More specifically, a pump gear 216 is mounted to the pump shaft 190 to rotate together therewith and is operatively connected, via an idler gear 218, to a crankshaft gear 220 that is mounted to the crankshaft 102. As such, as the crankshaft 102 rotates, the crankshaft gear 220 drives the pump gear 216, thereby rotating the pump shaft 190 and causing the pressure pump 186 to pump oil from the oil tank 182 outwardly therefrom and the scavenge pumps 188 to suction oil from different parts of the engine 100.

The path that is followed by the oil circulating in the lubrication system 180 will now be described with reference to FIGS. 15 to 20. It should be understood that FIGS. 15 to 20 illustrate the oil as it flows throughout the engine 100 and also illustrate some of the components of the lubrication system 180 and/or the engine 100 for clarity. Moreover, FIGS. 15 to 20 show various arrows that indicate a direction of flow of oil within the lubrication system 180.

Figure 18:
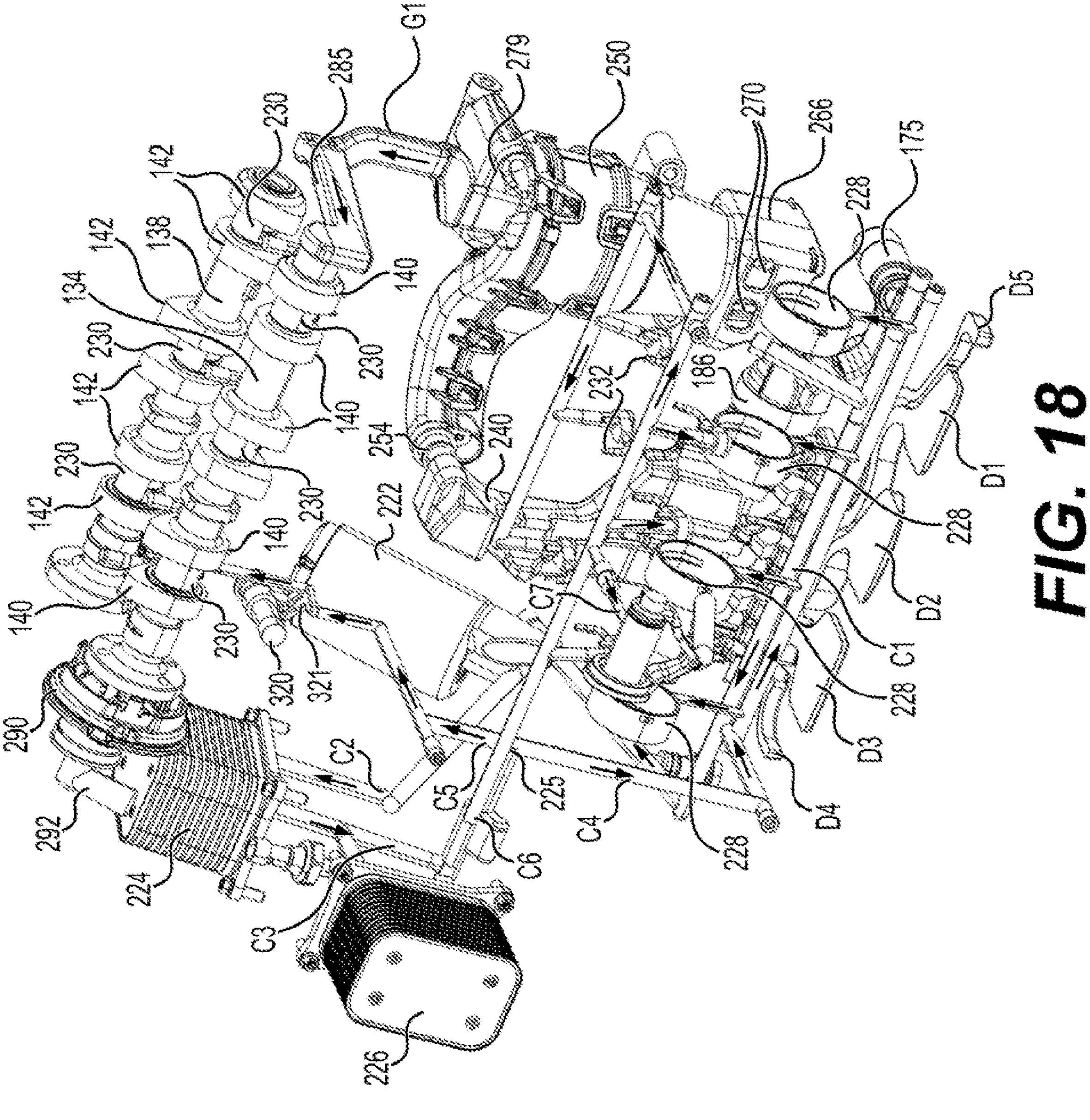
FIG. 18 is a perspective view taken from a top, rear, left side of the lubrication system of FIG. 15.

Starting at the pump module 184, which is fluidly connected to the oil tank 182, the pressure pump 186 pumps oil contained in the oil tank 182 outwardly via a conduit C1 (best shown in FIGS. 16 to 18) to an oil filter 222. The oil filter 222 removes certain impurities from the oil being circulated therethrough. From the oil filter 222, the oil travels along a conduit C2 to a first oil cooler 224. In this embodiment, the first oil cooler 224 is a plate heat exchanger in which a coolant is circulated to absorber heat from the oil received from the conduit C2. The cooled oil is discharged by the first oil cooler 224 and flows through a conduit C3 which directs part of the oil flow to a second oil cooler 226, while another part is directed away from the second oil cooler 226 and instead to other parts of the engine 100. Notably, as shown in FIG. 18, at a junction 225, the conduit C3 splits into two conduits C4, C5. The conduit C4 extends downwards from the junction 225 while the conduit C5 extends upwards from the junction 225. Notably, oil flows along the conduit C4 and is distributed to a plurality of plain bearings 228 that rotatably support the crankshaft 102 relative to the crankcase 104, thereby lubricating the plain bearings 228. The oil distributed to the plain bearings 228 may then flow downwards towards a bottom of the crankcase chambers 105. The oil flowing upwards through the conduit C5 (which may be referred to as an upper oil conduit) is distributed to the exhaust and intake camshafts 134, 138 and the intake and exhaust valves 120, 122. Notably, the conduit C5 distributes oil to a plurality of plain bearings 230 rotatably supporting the exhaust and intake camshafts 134, 138.

Figure 16:
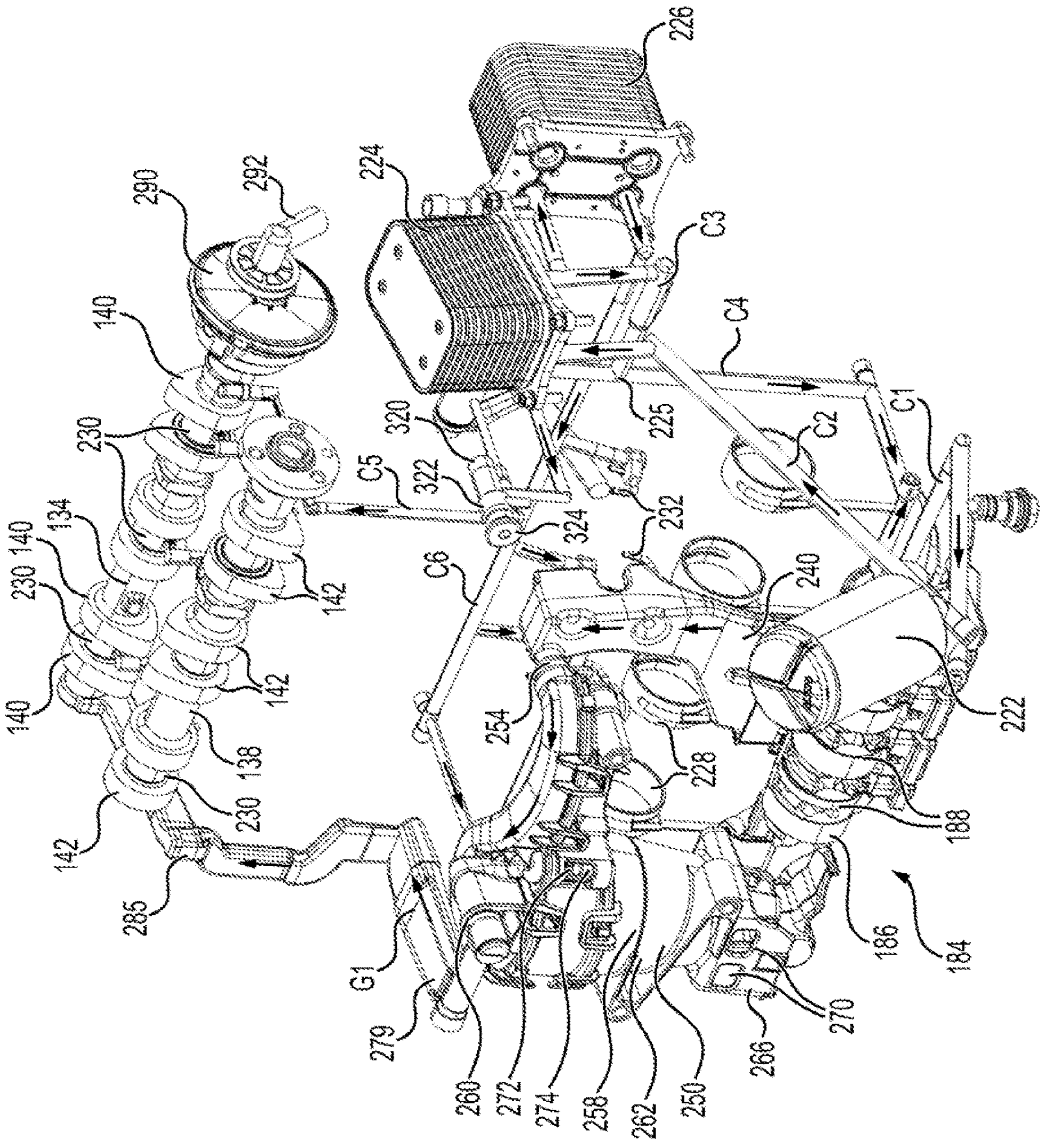
FIG. 16 is a perspective view taken from a top, front, right side of the lubrication system of FIG. 15.
Figure 17:
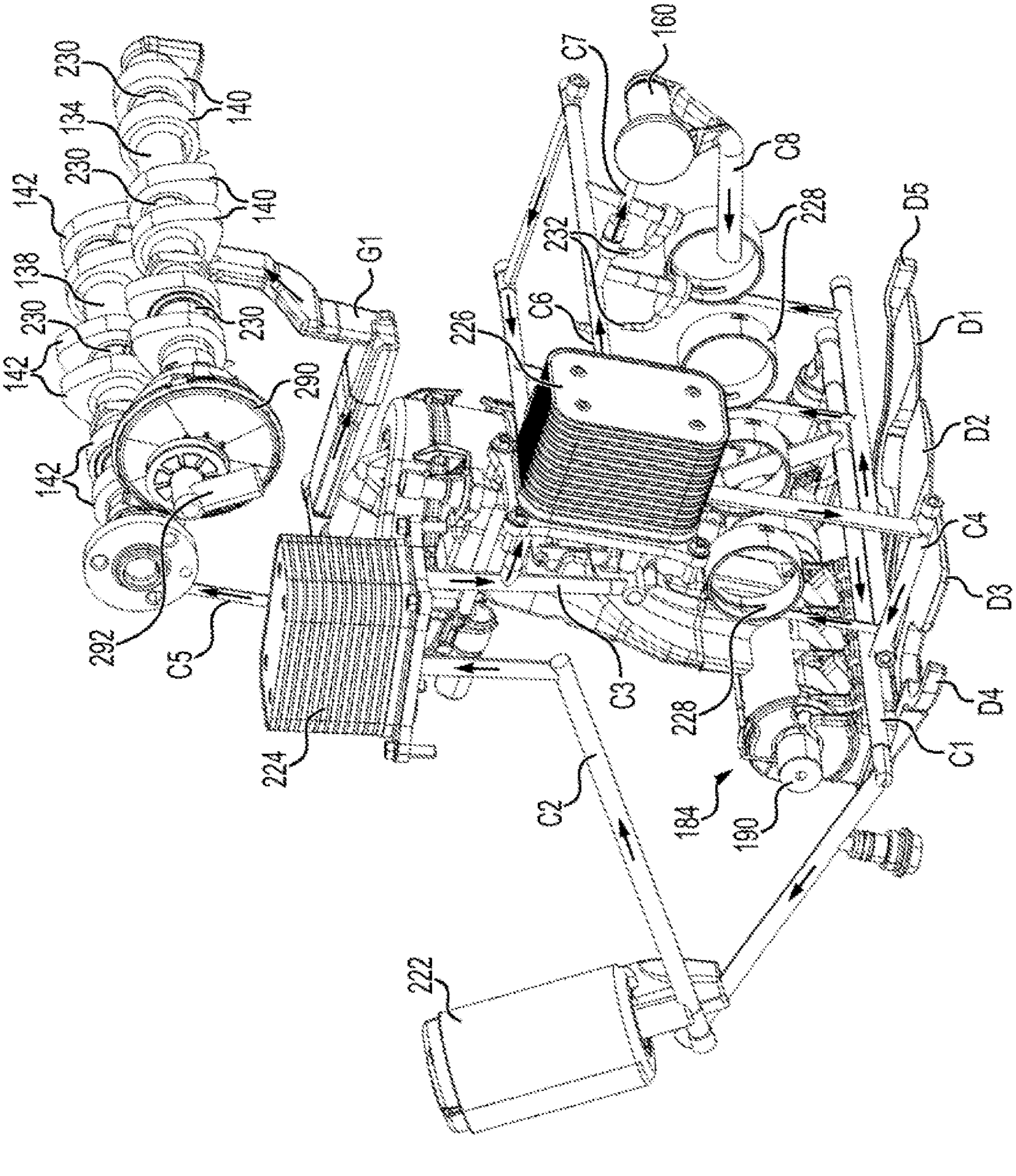
FIG. 17 is a perspective view taken from a top, front, left side of the lubrication system of FIG. 15.
Figure 18A:
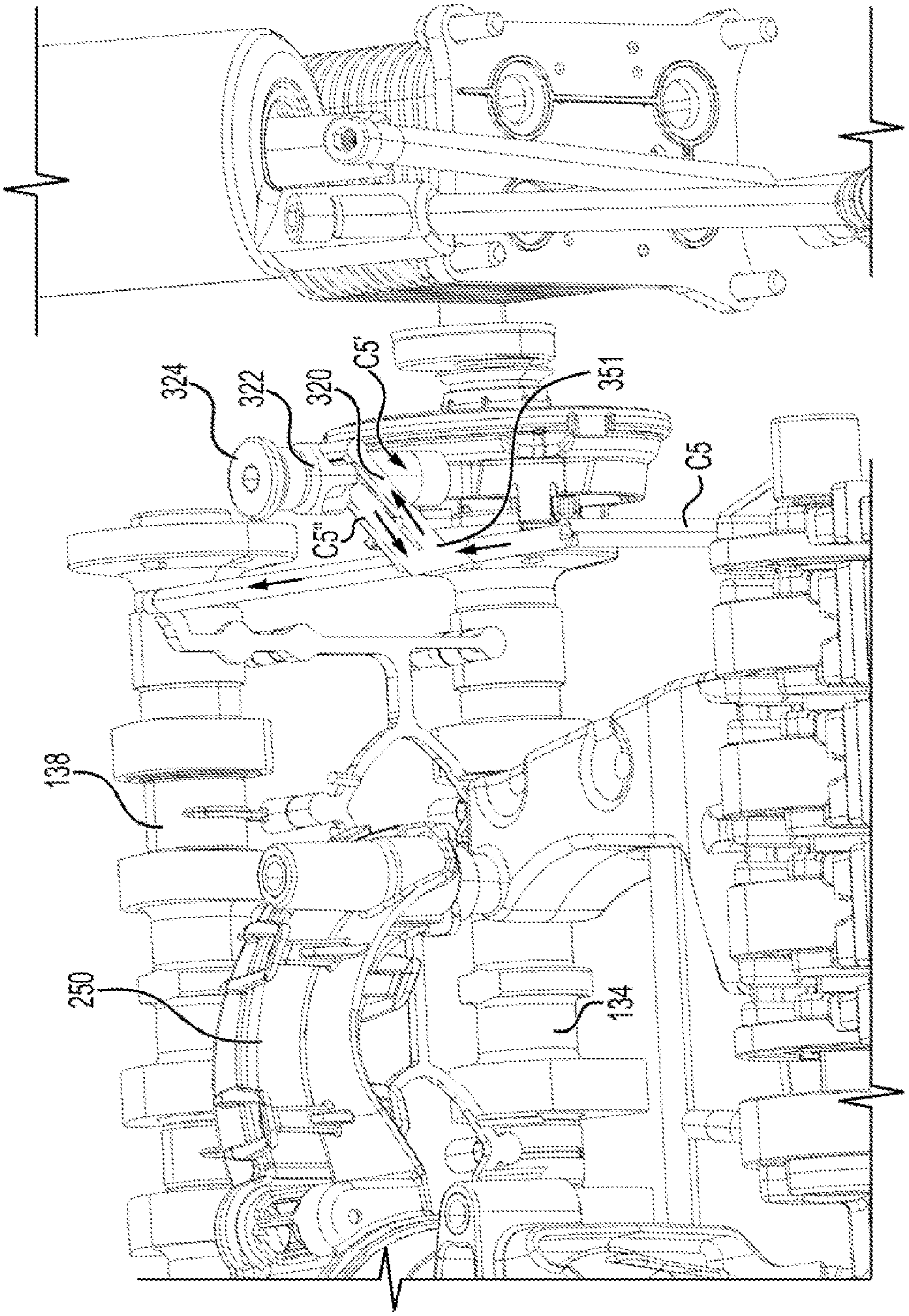
FIG. 18A is a perspective view taken from a bottom, rear, right side of part of the lubrication system of FIG. 15, showing oil flow to a chain tensioner of the engine.
Figure 22:
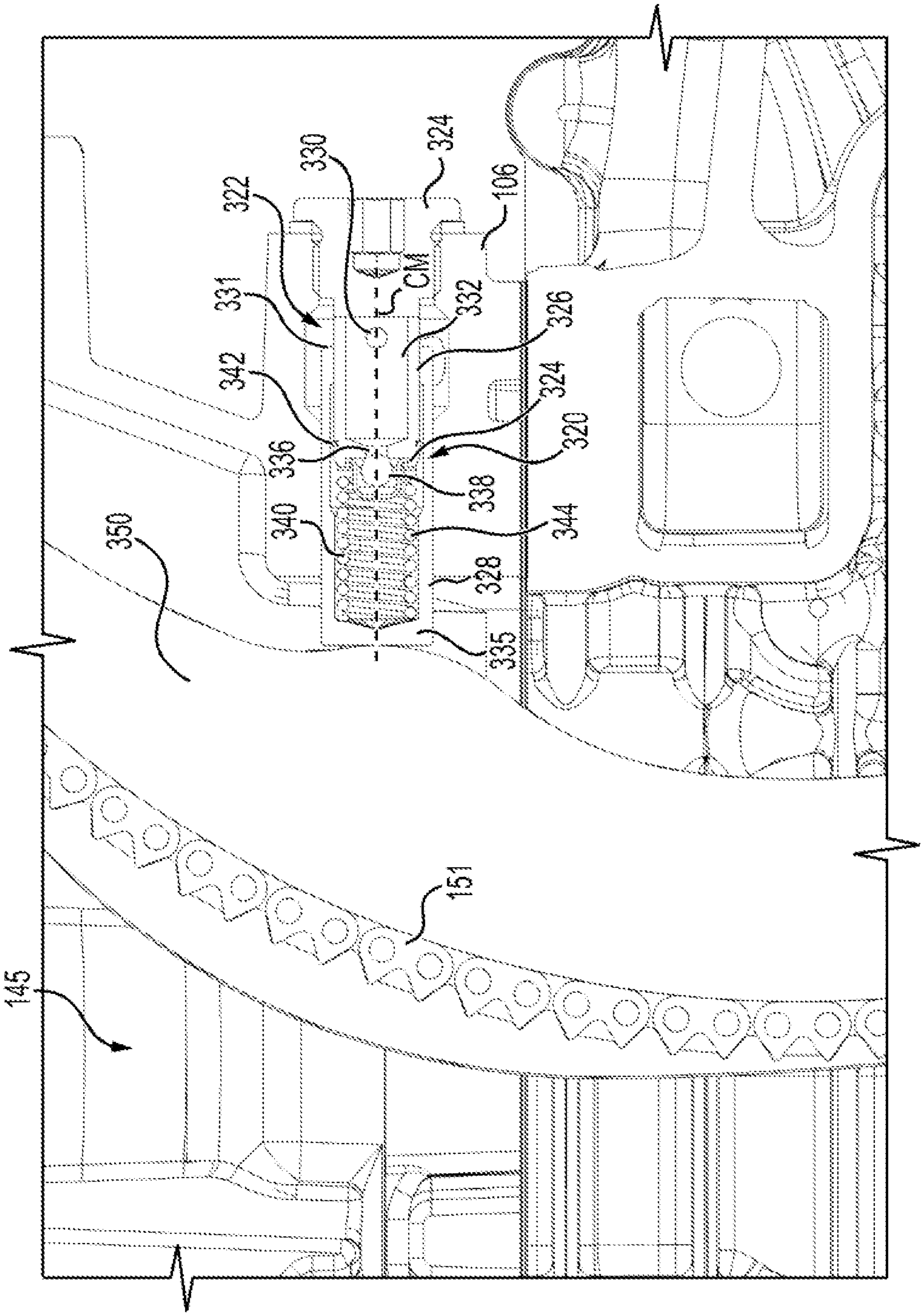
FIG. 22 is a detailed view of part of FIG. 21.

With reference to FIGS. 16, 18 and 18A, upstream from the exhaust and intake camshafts 134, 138, part of the oil flowing in the conduit C5 is routed to the chain tensioner 320 of the engine 100. As will be described in more detail below, the chain tensioner 320 is configured for tensioning the chain 151 disposed in the timing chamber 145. As best shown in FIG. 18A, oil is routed to the chain tensioner 320 through a conduit C5' that branches off from the conduit C5 at a junction 321. The oil flows along the conduit C5' and reaches a tensioner chamber 322 (FIG. 22) to pressurize the chain tensioner 320 and thereby tension the chain 151. As shown in FIG. 22, the tensioner chamber 322 is defined by the cylinder head 106. An opening defined by an outer surface of the cylinder head 106 opens into the tensioner chamber 322 and is closed off by a fastener 324 of the chain tensioner 320.

As shown in FIGS. 21 and 22, the chain tensioner 320 includes the fastener 324, a fixed base 326 connected to the fastener 324, and a movable member 328 movably connected to the fixed base 326. The fastener 324 threadedly engages the cylinder head 106. The fixed base 326 extends inwardly from the fastener 324 along an axis CM (FIG. 22). The fixed base 326 is hollow and has a sidewall defining an aperture 330. The fixed base 326 is disposed in the tensioner chamber 322 such that the aperture 330 defined by the fixed base 326 fluidly communicates the tensioner chamber 322 to an internal space 332 defined by the fixed base 326. An inner end 334 of the fixed base 326 opposite the fastener 324 defines an aperture 336. A check valve 338 is connected to the inner end 334 of the fixed base 326 to allow fluid flow in a single direction through the aperture 336, namely from the internal space 332 outwards through the aperture 336.

In this embodiment, the movable member 328 is a hollow pin defining an internal space 340. The movable member 328 receives part of the fixed base 326 in the internal space 340. Notably, the fixed base 326 is inserted into the internal space 340 through an opening defined by an outer end 331 of the movable member 328. The movable member 328 is slidable relative to the fixed base 326 along the axis CM. A sealing member 342 is disposed between an outer peripheral surface of the fixed base 326 and an inner peripheral surface of the movable member 328. Moreover, a resilient element 344, namely a coil spring, is disposed within the internal space 340 of the movable member 328 between the inner end 334 of the fixed base 326 and an inner end 335 of the movable member 328. The resilient element 344 thus applies a force on the movable member 328 that causes the movable member 328 to slide along the axis CM away from the fixed base 326 and the fastener 324 to some degree. This causes the movable member 328 to push against a chain guide 350 of the engine 100 supporting the chain 151 in the timing chamber 145. The force applied by the resilient element 344 on the movable member 328 is sufficient to tension the chain 151 to a degree that is adequate for starting of the engine 100.

In operation, the oil is routed into the tensioner chamber 233 via the conduit C5' to pressurize the chain tensioner 320. Notably, the oil routed into the tensioner chamber 233 enters the internal space 332 of the fixed base 326 through the aperture 330. The oil then flows out of the internal space 332 through the aperture 336 and thus flows into the internal space 340 of the movable member 328. This causes a pressurization of the internal space 340, thereby causing the movable member 328 to slide away from the fixed base 326 and the fastener 324, which in turn causes the inner end 335 of the movable member 328 to apply a force on the chain guide 350. The force applied on the chain guide 350 by the chain tensioner 320 ensures that the chain guide 350 remains in a position that applies an adequate amount of tension on the chain 151 during operation of the engine 100. Once the engine is off, the oil supply into the tensioner chamber 322 ceases, and the oil in the internal space of the movable member 328 is slowly evacuated therefrom. The movable member 328 is then only forced away from the fixed base 326 by the resilient member 344, which applies enough pressure on the movable member 328 to ensure that the chain 151 has enough tension for a safe engine start.

As shown in FIG. 18A, a conduit C5" also extends from the conduit C5 at the junction 321 and similarly fluidly connects the conduit C5 to the tensioner chamber 322. The conduit C5" is provided to allow oil to be discharged from the tensioner chamber 322. In practice, oil flows into the tensioner chamber 322 via either one of the conduits C5', C5", namely through whichever one of the conduits C5', C5" has a higher pressure. Notably, once the lubrication system 180 is pressurized, there is a limited amount of oil flow into and out of the tensioner chamber 322. Rather small volumes of oil will flow into the tensioner chamber 322 depending on variations in oil pressure.

Returning now to the conduit C3, as mentioned above, part of the oil flowing therethrough is directed to the second oil cooler 226 which further cools the oil (i.e., a temperature of the oil discharged from the second oil cooler 226 is lower than a temperature of the oil discharged from the first oil cooler 224). In this embodiment, the second oil cooler 226 is a plate heat exchanger in which a coolant is circulated to absorber heat from the oil received from the first oil cooler 224. The oil discharged by the second oil cooler 226 then flows through a conduit C6 (best shown in FIGS. 18 and 19) which further distributes the oil to other components of the engine 100. In particular, part of the oil flowing through the conduit C6 is diverged through a conduit C7 which is fluidly connected to the bearing cartridge 160 of the turbocharger 150. The bearing cartridge 160 is thus lubricated and cooled by the oil routed thereto. The oil received by the bearing cartridge 160 is then discharged through a conduit C8 which routes the oil back into the crankcase 104. A remainder of the oil flowing in the conduit C6 is distributed to a plurality of lubrication nozzles 232 disposed in the crankcase 104. Notably, the lubrication nozzles 232 are oriented such that oil discharged therefrom is sprayed onto the pistons 112 from an underside thereof. The lubrication nozzles 232 thus ensure that the pistons 112 are properly lubricated and cooled.

Figure 19:
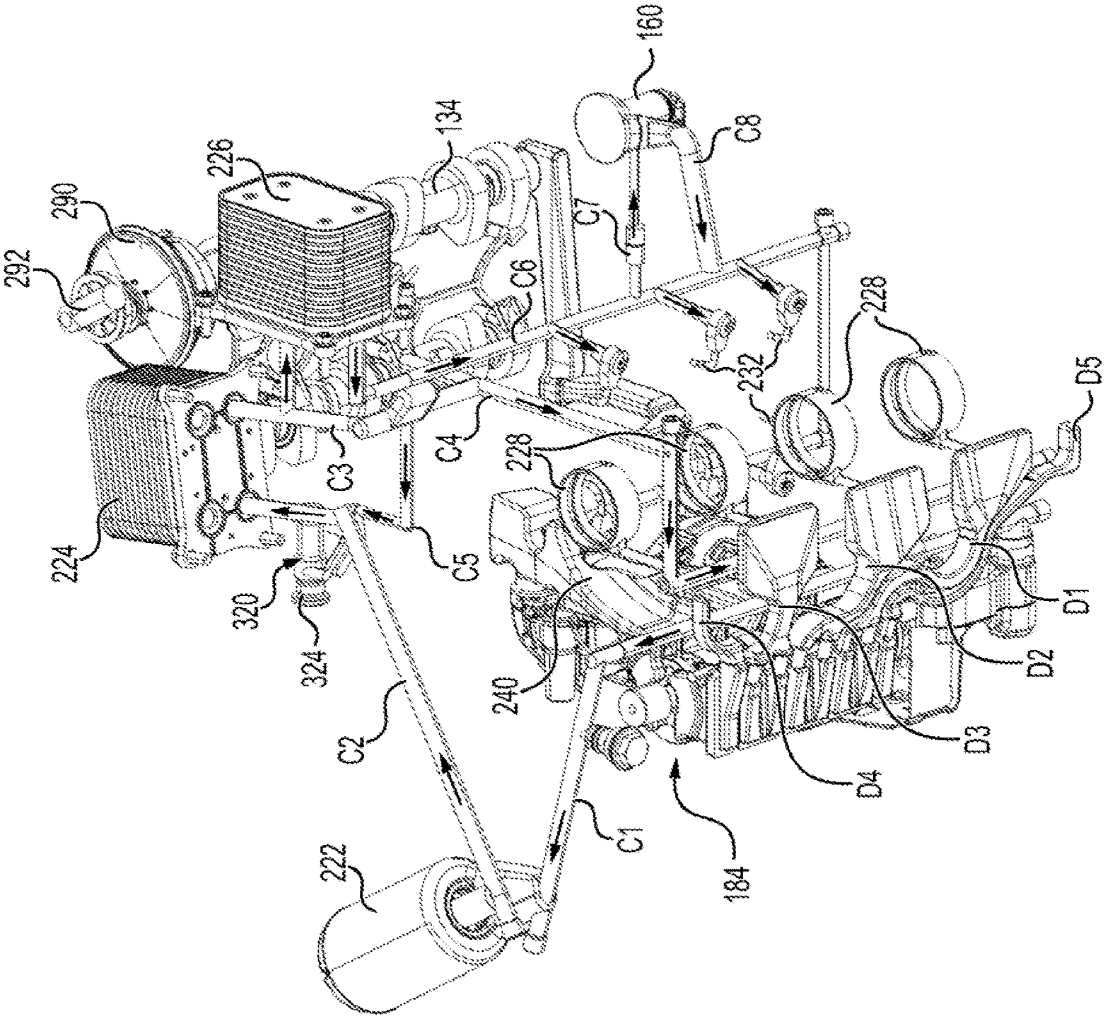
FIG. 19 is a perspective view taken from a bottom, front, left side of the lubrication system of FIG. 15.
Figure 20:
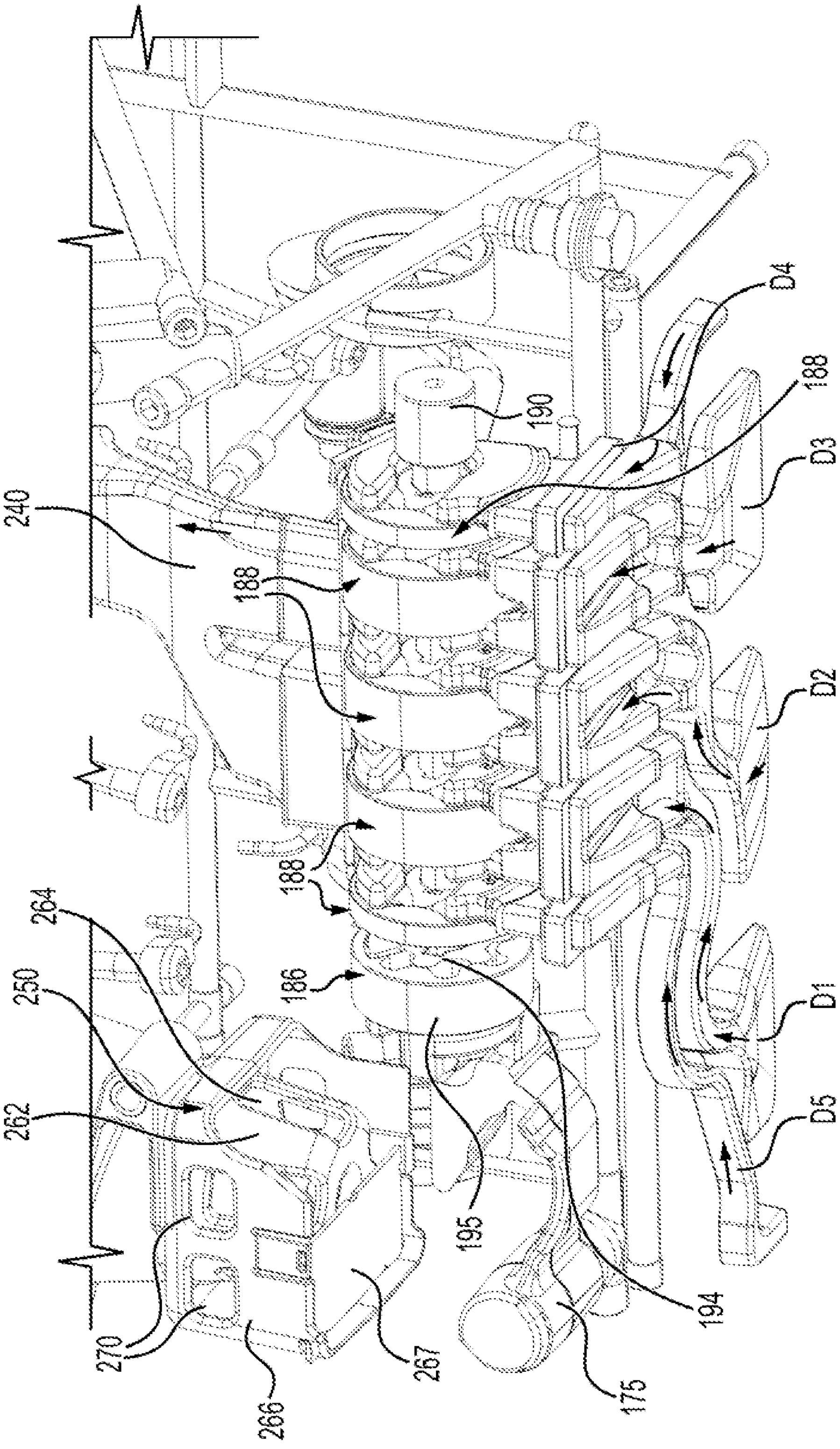
FIG. 20 is a perspective view taken from a bottom, front, right side of part of the lubrication system of FIG. 15.

The oil circulated throughout the engine 100 in the manner described above is then drawn back to the oil tank 182 by the scavenge pumps 188. Notably, in this embodiment, each scavenge pump 188 is fluidly connected with a particular engine compartment of a plurality of engine compartments defined by the engine 100 in order to draw oil therefrom. In this embodiment, five engine compartments are defined by the engine 100, including the three crankcase chambers 105. Each of the scavenge pumps 188 thus draws oil from its associated engine compartment. For instance, as best shown in FIGS. 19 and 20, three conduits D1, D2, D3 fluidly connect respective ones of the crankcase chambers 105 to corresponding ones of the scavenge pumps 188. In particular, the conduits D1, D2, D3 extend from the bottom of the respective crankcase chambers 105 to the three central scavenge pumps 188 (i.e., disposed axially between the two scavenge pumps 188 that are closer to respective ones of the inner and outer ends 202, 204 of the pump shaft 190). A conduit D4 fluidly connects a fourth one of the scavenge pumps 188 to the timing chamber 145 and a front side of the cylinder head 106. Lastly, a conduit D5 fluidly connects a fifth one of the scavenge pumps 188 to a rear side of the cylinder head 106 and a secondary gas separator 290 which will be described in more detail below. The conduit D5 also fluidly connects a rearmost one of the plain bearings 228 to the fifth one of the scavenge pumps 188.

Figure 15:
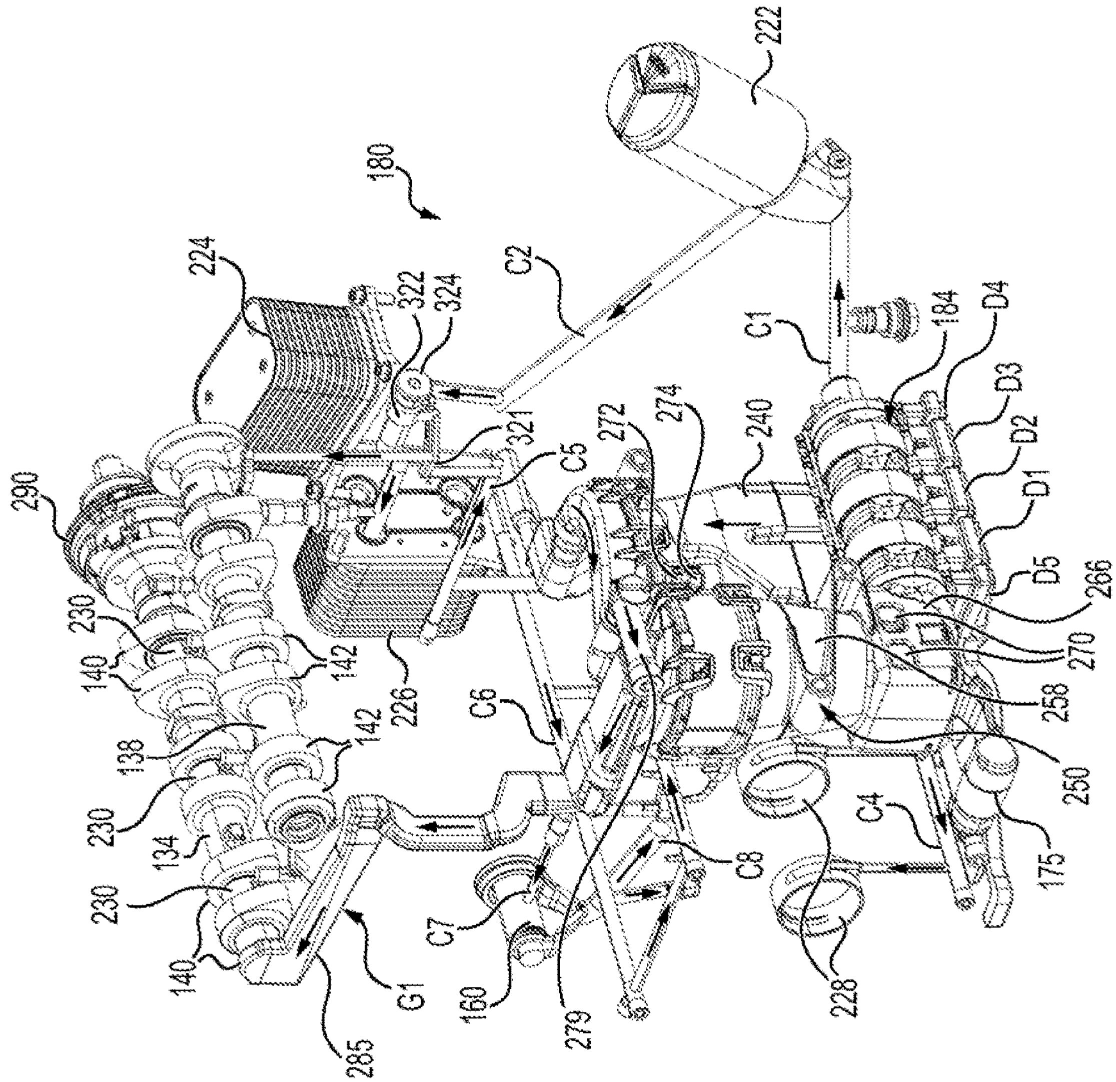
FIG. 15 is a perspective view taken from a top, rear, right side of a lubrication system of the engine of FIG. 3, showing an oil path of the oil flowing in the lubrication system and selected components of the engine.

As shown in FIG. 15, the lubrication system 180 also includes a pressure relief valve 175 for limiting the pressure in the lubrication system 180. The pressure relief valve 175 is disposed upstream from the pressure pump 186.

As best shown in FIGS. 15 and 16, the oil drawn by the scavenge pumps 188 is then pumped outwards through a common conduit 240 that extends upwardly from the pump module 184. The oil flows along the conduit 240 and into a cyclonic separator 250 that is configured to separate gas from oil received therein within an internal separator chamber 252 defined by the cyclonic separator 250. Notably, as will be described in more detail below, the oil follows a path in the cyclonic separator 250 that causes a separation of gases (e.g., blow-by gas) from the oil that is circulated in the lubrication system 180. For instance, during operation, blow-by gas leaks between the cylinders' walls and the pistons 112 and into the crankcase 104. As such, this gas can be accumulated in the oil circulated through the engine 100 which can negatively affect the performance of the pump module 184. The cyclonic separator 250 therefore separates such gas contained in the oil circulated by the lubrication system 180 to remove it from circulation. The cyclonic separator 250 is fluidly connected to the oil tank 182 such that the oil that is discharged by the cyclonic separator 250 is reintroduced into the oil reservoir 185 of the oil tank 182 to be pumped out to the different parts of the engine 100 by the pump module 184.

The cyclonic separator 250 has an oil inlet 254 that is fluidly connected to the pump module 184 for receiving oil into the internal separator chamber 252, and an oil outlet 256 for discharging oil from the internal separator chamber 252 and into the oil reservoir 185 of the oil tank 282. The cyclonic separator 250 has a vortex forming portion 258 that is configured to cause oil flowing therethrough within the internal separator chamber 252 to define a spiral path in order to separate at least part of a gas content therefrom. Notably, the vortex forming portion 258 has a generally frustoconical shape. The vortex forming portion 258 is defined by a peripheral wall 262 of the cyclonic separator 250.

In this embodiment, the oil inlet 254 feeds into the vortex forming portion 258 along a top portion of the peripheral wall 262. As best shown in FIG. 10, the oil outlet 256 includes a plurality of outlet openings 264 defined by the peripheral wall 262 along a bottom portion thereof. Notably, the outlet openings 264 are distributed evenly about a center of the generally frustoconical shape of the peripheral wall 262. The oil thus exits radially outwards through the outlet openings 264. The oil inlet 254 is disposed vertically higher than the oil outlet 256. A gas outlet 260 of the cyclonic separator 250 discharges the gas that is separated by the vortex forming portion 258. The gas outlet 260 is disposed at an upper end of the cyclonic separator 250 and is in communication with an inner outlet tube 265 (FIG. 8A) disposed within the internal separator chamber 252.

In this embodiment, the cyclonic separator 250 is also configured to slow down the oil as it exits the cyclonic separator 250 in order to minimize splashing of the oil which could otherwise form air bubbles in the oil. To that end, the cyclonic separator 250 has an outer wall 266 that is disposed outwardly from the peripheral wall 262 such that a space 268 is defined between the peripheral wall 262 and the outer wall 266. The outlet openings 264 open into the space 268 such that oil from the internal separator chamber 252 flows into the space 268 as it flow through the outlet openings 264. The outer wall 266 defines a plurality of flow control openings 270 that are spaced from a lower end of the outer wall 266. In other words, the flow control openings 270 are disposed at a given height measured from the lower end of the outer wall 266. As such, in use, oil accumulating in the space 268 between the peripheral wall 262 and the outer wall 266 flows into the oil reservoir 185 via the flow control openings 270. This can be helpful to slow down the oil as it is discharged into the oil reservoir 185.

As shown in FIG. 20, in this embodiment, a bracing member 267 is connected to different sections of the outer wall 266 to reinforce the outer wall 266. The bracing member 267 is disposed near the lower end of the outer wall 266.

Furthermore, as shown in FIGS. 15 and 16, in this embodiment, the cyclonic separator 250 defines a gas exchange opening 272 that fluidly connects an upper portion of the oil reservoir 185 with the gas outlet 260 of the cyclonic separator 250. Notably, the gas exchange opening 272 allows for compensation of air/gas pressure in the oil reservoir 185 with varying oil levels therein. During regular operation, the oil level within the oil reservoir 185 is below the gas exchange opening 272 such that the oil within the oil reservoir 185 does not flow into the gas exchange opening 272. A backflow valve 274 is disposed within a recess defined by a body of the cyclonic separator 250 and is configured to selectively close off the gas exchange opening 272 based on an orientation of the engine 100. In particular, the backflow valve 274 is movable vertically to selectively close off the gas exchange opening 272. In an upright orientation of the engine 100 whereby an upper end of the engine 100 is further from the ground surface on which the vehicle 20 travels than a lower end of the engine 100, the backflow valve 274 sits in the recess and does not close off the gas exchange opening 272. Conversely, in an upside-down orientation of the engine 100 whereby the upper surface of the engine 100 is closer to the ground surface than the lower surface of the engine 100 (e.g., due to a rollover), the backflow valve 274 is moved vertically by gravity to close off the gas exchange opening 272 and thereby prevent oil to flow from the oil reservoir 185 into the gas exchange opening 272.

Figure 12:
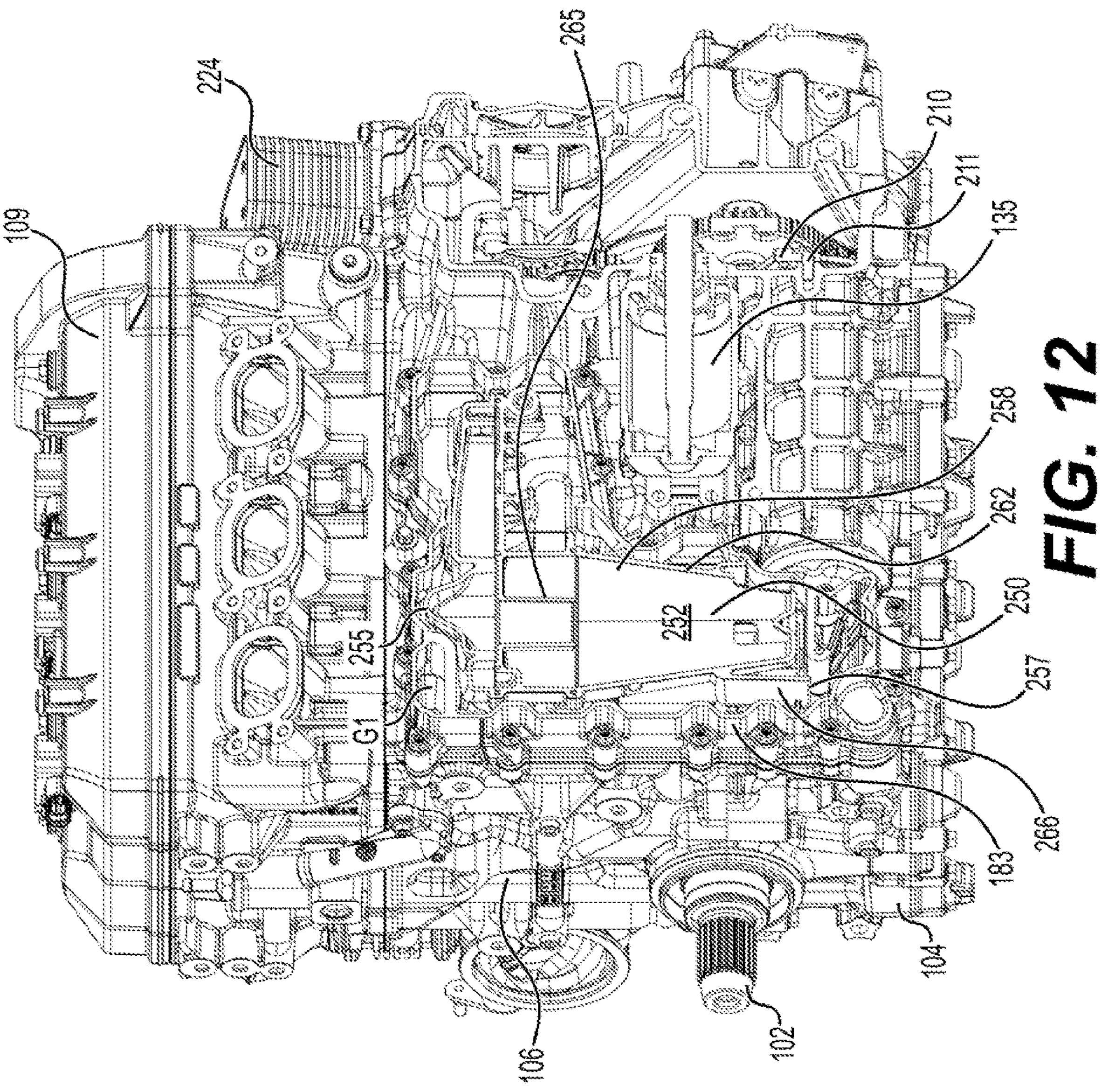
FIG. 12 is a perspective view of a cross-section of the engine of FIG. 3 taken along line 12-12 in FIG. 6.

In this embodiment, the cyclonic separator 250 is disposed within the oil tank 182 such that the oil reservoir 185 of the oil tank 182 is defined around the cyclonic separator 250. That is, the cyclonic separator 250 is located within an internal volume defined by the oil tank 182. In particular, in this example, the cyclonic separator 250 is fixed to the crankcase 104 and cylinder block 107 and is contained within the oil tank housing 183. The cyclonic separator 250 is disposed between the crankcase 104 and the oil tank housing 183. Notably, as best shown in FIG. 12, the cyclonic separator 250 is disposed between an upper end 187 and a lower end 189 of the oil tank 182. The upper and lower ends 187, 189 of the oil tank 182 define a height of the oil tank 182 therebetween. Thus, as shown in FIG. 12, the height of the oil tank 182 is therefore greater than a height of the cyclonic separator 250, measured between an upper end 255 and a lower end 257 of the cyclonic separator 250. Thus, as will be appreciated, the cyclonic separator 250 is of a relatively small size in order to fit in such a confined space. Moreover, the crankshaft axis 125 is disposed vertically between the upper and lower ends of the cyclonic separator 250.

Figure 8B:
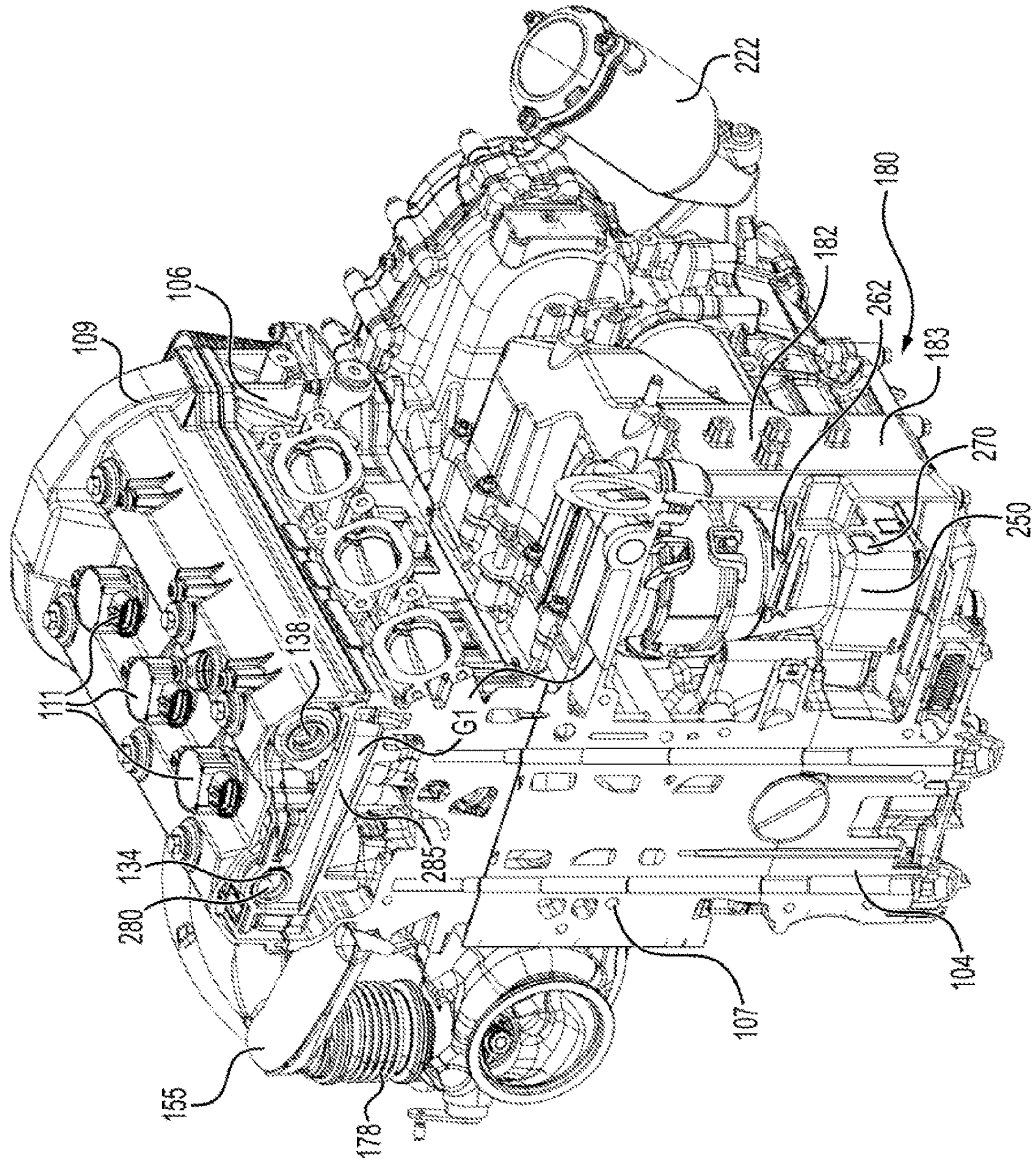
FIG. 8B is a perspective view of a cross-section of the engine of FIG. 3 taken along line 8B-8B in FIG. 6.

With reference to FIGS. 15 to 20, the gas discharged from the gas outlet 260 flows through a conduit 279 defined by the cylinder block 107. Notably, the conduit 279 extends upwardly from the gas outlet 260 and towards the cylinder head 106. In particular, as shown in FIG. 8B, the cylinder head 106 defines a gas interconnecting channel 285 that fluidly connects the conduit 279 to the exhaust camshaft 134. More specifically, together, the conduit 279 and the gas interconnecting channel 285 fluidly connect the gas outlet 260 to an outlet conduit 280 (FIG. 9) defined by the exhaust camshaft 134. The outlet conduit 280 extends along the camshaft axis 136 from one end of the exhaust camshaft 134 to an opposite end thereof. It is contemplated that, in other embodiments, the outlet conduit 280 could be defined by the intake camshaft 138 instead.

It is noted that gas distributed through the outlet conduit 280 may still contain some droplets of oil and also some oil mist. As the oil mist passes through gas interconnecting channel 285 and outlet conduit 280 (a gas discharge passage G1, described below), a portion of it condensates at the walls, forming oil droplets, which can be separated from the gas by the secondary gas separator 290. Therefore, the relatively great length of the gas discharge passage G1 serves to increase the effectiveness of the secondary gas separation.

Figure 9:
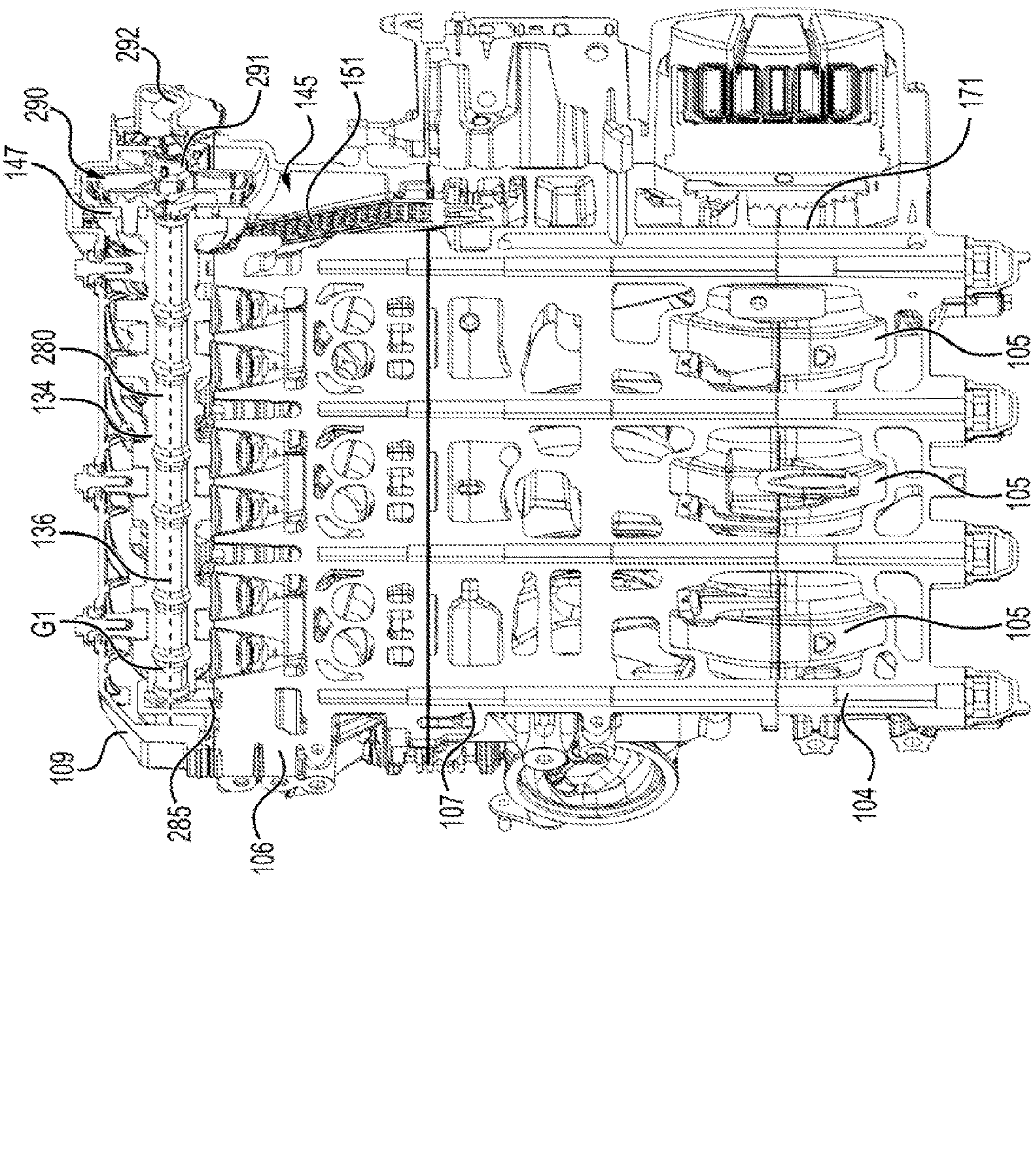
FIG. 9 is a perspective view of a cross-section of the engine of FIG. 3 taken along line 9-9 in FIG. 6.

The gas distributed through the outlet conduit 280 may still contain some droplets of oil. To that end, in this embodiment, the secondary gas separator 290 is fluidly connected to the outlet conduit 280 and is disposed downstream therefrom in order to receive the gas discharged by the outlet conduit 280 to further separate the gas from the oil. The secondary gas separator 290 is operatively connected to the exhaust camshaft 134 in order to rotate therewith. As the secondary gas separator 290 rotates about the exhaust camshaft axis 136, oil droplets are removed from the gas incoming from the outlet conduit 280 as the oil droplets are projected against the inner peripheral surface of the secondary gas separator 290. The oil droplets then flow through a separator oil outlet (not shown) and into a conduit that is fluidly connected to the crankcase 104 such that this oil can be drawn back by the scavenge pumps 188. As shown in FIG. 9, the secondary gas separator 290 also has a separator gas outlet 291 through which the secondary gas separator 290 discharges the gas from the secondary gas separator 290. In this embodiment, a discharge conduit 292 fluidly connects the secondary gas outlet 291 to the air intake system of the engine 100 such as to feed the gas extracted from the oil back into the air intake system. In other words, the separator gas outlet 291 is fluidly connected to the intake ports 113 of the cylinders 108.

It is contemplated that the secondary gas separator 290 could be omitted in other embodiments.

As will be appreciated, the conduit 279, the gas interconnecting channel 285 and the outlet conduit 280 form a gas discharge passage G1 through which the gas separated by the cyclonic separator 250 is discharged from the lubrication system 180. Notably, the gas discharge passage G1 is defined in part by the oil tank housing 183, the cylinder block 107, the cylinder head 106, and portions of bearing brackets 167 (FIG. 7) supporting the exhaust camshaft 134 and the intake camshaft 138. In this embodiment, the gas discharge passage G1 is sealed from the negative pressure that is generated in the crankcase 104 by the dry-sump lubrication system 180. In particular, the gas discharge passage G1 is under positive pressure, as opposed to the crankcase 104 and the timing chamber 145, which forces the gas to be drawn into the gas discharge passage G1. This may be helpful to ensure more efficient discharging of the gas.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An internal combustion engine for a vehicle, the engine comprising:

a crankcase;

a crankshaft disposed at least in part in the crankcase;

a cylinder block connected to the crankcase, the cylinder block defining at least one cylinder;

at least one piston operatively connected to the crankshaft and disposed in a corresponding one of the at least one cylinder;

an oil tank defining an oil reservoir configured to contain oil therein;

a pump configured to pump oil from the oil reservoir of the oil tank to lubricate parts of the engine; and a cyclonic separator disposed within the oil tank and configured to separate gas from oil received therein, the cyclonic separator defining an internal separator chamber for circulation of oil therein, the cyclonic separator comprising:

a vortex forming portion configured to cause oil flowing therethrough within the internal separator chamber to define a spiral path in order to separate at least part of a gas content therefrom, the cyclonic separator having a peripheral wall defining the vortex forming portion;

an oil inlet for receiving oil into the internal separator chamber, the oil inlet being fluidly connected to the pump, the oil inlet feeding into the vortex forming portion along a top portion of the peripheral wall;

an oil outlet for discharging oil from the internal separator chamber and into the oil reservoir of the oil tank, the oil outlet comprising at least one outlet opening defined by the peripheral wall along a bottom portion thereof;

a gas outlet for discharging gas from the internal separator chamber; and an outer wall disposed outwardly from the peripheral wall such that, in use, oil discharged from the internal separator chamber through the at least one outlet opening accumulates in a space defined between the peripheral wall and the outer wall, the outer wall defining at least one flow control opening spaced from a lower end of the outer wall, and in use, oil accumulating between the peripheral wall and the outer wall flows into the oil reservoir of the oil tank via the at least one flow control opening.

2. The engine of claim 1, wherein:

the oil tank has an upper end and a lower end; and the cyclonic separator is disposed between the upper and lower ends of the oil tank.

3. The engine of claim 1, wherein the oil inlet is vertically higher than the oil outlet.

4. The engine of claim 1, wherein:

the oil tank comprises an oil tank housing fastened to at least one of the crankcase and the cylinder block; and the cyclonic separator is disposed between the oil tank housing and the at least one of the crankcase and the cylinder block.

5. The engine of claim 1, wherein:

the cyclonic separator has an upper end and a lower end, a height of the cyclonic separator being measured between the upper and lower ends thereof; and a combined height of the crankcase and the cylinder block is greater than the height of the cyclonic separator.

6. The engine of claim 5, wherein:

the crankshaft is rotatable about a crankshaft axis; and the crankshaft axis is disposed vertically between the upper and lower ends of the cyclonic separator.

7. The engine of claim 1, wherein:

the cyclonic separator defines a gas exchange opening fluidly connecting the oil reservoir of the oil tank to the gas outlet of the cyclonic separator; and the cyclonic separator further comprises a backflow valve configured to close off the gas exchange opening based on an orientation of the engine.

8. The engine of claim 1, wherein:

each of the at least one cylinder has an intake port and an exhaust port;

the engine further comprises:

at least one intake valve operable to control air flow through the intake port of a corresponding one of the at least one cylinder;

at least one exhaust valve operable to control flow of exhaust gas through the exhaust port of a corresponding one of the at least one cylinder;

an intake camshaft rotatable about an intake camshaft axis, the at least one intake valve being operably connected to the intake camshaft; and an exhaust camshaft rotatable about an exhaust camshaft axis, the at least one exhaust valve being operably connected to the exhaust camshaft;

and at least one of the intake camshaft and the exhaust camshaft defines an outlet conduit fluidly connected to the gas outlet of the cyclonic separator.

9. The engine of claim 8, wherein the outlet conduit is fluidly connected to the intake port of the at least one cylinder.

10. The engine of claim 8, wherein:

the engine further comprises a secondary gas separator fluidly connected to the outlet conduit and disposed downstream therefrom, the secondary gas separator being rotatable to remove oil droplets from gas incoming from the outlet conduit;

the secondary gas separator has a separator gas outlet fluidly connected to the intake port of the at least one cylinder; and the secondary gas separator has a separator oil outlet fluidly connected to the crankcase.

11. The engine of claim 1, wherein:

the engine comprises a dry-sump lubrication system comprising the pump, the pump being a pressure pump; and the dry-sump lubrication system further comprises at least one scavenge pump configured to draw oil from a respective part of the engine.

12. A vehicle comprising:

a frame;

a seat supported by the frame;

a plurality of ground-engaging members operatively connected to the frame; and the engine of claim 1, at least one of the ground-engaging members being operatively connected to the engine for propulsion of the vehicle.

13. An internal combustion engine for a vehicle, the engine comprising:

a crankcase;

a crankshaft disposed at least in part in the crankcase;

a cylinder block connected to the crankcase, the cylinder block defining at least one cylinder;

a cylinder head connected to the cylinder block;

at least one piston operatively connected to the crankshaft and disposed in a corresponding one of the at least one cylinder;

an oil tank defining an oil reservoir configured to contain oil therein;

a dry-sump lubrication system comprising:

a pressure pump configured to pump oil from the oil tank to lubricate parts of the engine; and at least one scavenge pump configured to draw oil from a respective part of the engine;

a cyclonic separator fluidly connected to the oil tank and configured to separate gas from oil received therein, the cyclonic separator having a gas outlet for discharging gas from an internal separator chamber defined by the cyclonic separator; and a gas discharge passage fluidly connected to the gas outlet of the cyclonic separator, the gas discharge passage being sealed from the negative pressure generated in the crankcase by the dry sump lubrication system.

14. The engine of claim 13, wherein:

each of the at least one cylinder has an intake port and an exhaust port;

the engine further comprises:

at least one intake valve operable to control air flow through the intake port of a corresponding one of the at least one cylinder;

at least one exhaust valve operable to control flow of exhaust gas through the exhaust port of a corresponding one of the at least one cylinder;

an intake camshaft rotatable about an intake camshaft axis, the at least one intake valve being operably connected to the intake camshaft; and an exhaust camshaft rotatable about an exhaust camshaft axis, the at least one exhaust valve being operably connected to the exhaust camshaft;

at least one of the intake camshaft and the exhaust camshaft defines an outlet conduit fluidly connected to the gas outlet of the cyclonic separator; and the gas discharge passage comprises the outlet conduit.

15. The engine of claim 14, wherein the outlet conduit is fluidly connected to the intake port of the at least one cylinder.

16. The engine of claim 14, wherein:

the engine further comprises a secondary gas separator fluidly connected to the outlet conduit and disposed downstream therefrom, the secondary gas separator being rotatable to remove oil droplets from gas incoming from the outlet conduit;

the secondary gas separator has a separator gas outlet fluidly connected to the intake port of the at least one cylinder; and the secondary gas separator has a separator oil outlet fluidly connected to the crankcase.

17. The engine of claim 14, wherein:

the cylinder block defines a gas interconnecting channel that fluidly connects the gas outlet of the cyclonic separator to the outlet conduit of the at least one of the intake camshaft and the exhaust camshaft; and the gas discharge passage comprises the gas interconnecting channel.

* * * * *